US009491043B2

(12) United States Patent
Kaneko et al.

(10) Patent No.: US 9,491,043 B2
(45) Date of Patent: Nov. 8, 2016

(54) COMMUNICATION PATH SWITCHING DEVICE, COMMUNICATION PATH SWITCHING METHOD AND COMMUNICATION PATH SWITCHING PROGRAM

(71) Applicant: Hitachi, Ltd., Tokyo (JP)

(72) Inventors: Sayuri Kaneko, Tokyo (JP); Junji Kinoshita, Tokyo (JP); Kazuma Yumoto, Tokyo (JP); Osamu Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 160 days.

(21) Appl. No.: 14/261,703

(22) Filed: Apr. 25, 2014

(65) Prior Publication Data

US 2014/0321460 A1    Oct. 30, 2014

(30) Foreign Application Priority Data

Apr. 26, 2013    (JP) .................................. 2013-093828

(51) Int. Cl.
| | |
|---|---|
| *H04L 12/28* | (2006.01) |
| *H04L 12/56* | (2006.01) |
| *H04L 12/24* | (2006.01) |
| *H04L 12/931* | (2013.01) |
| *H04L 12/939* | (2013.01) |
| *H04L 12/933* | (2013.01) |

(52) U.S. Cl.
CPC ......... *H04L 41/0659* (2013.01); *H04L 49/552* (2013.01); *H04L 49/65* (2013.01); *H04L 49/10* (2013.01)

(58) Field of Classification Search
USPC ............. 370/386, 400; 455/456.1; 726/1, 25
See application file for complete search history.

(56) References Cited

U.S. PATENT DOCUMENTS

| | | | | |
|---|---|---|---|---|
| 8,724,456 | B1* | 5/2014 | Hong | .......................G06F 11/00 370/225 |
| 2006/0271677 | A1* | 11/2006 | Mercier | ............G06F 17/30197 709/224 |
| 2007/0074281 | A1* | 3/2007 | Ikeda | ........................H04L 67/24 726/13 |
| 2009/0126022 | A1* | 5/2009 | Sakaki | ......................G06F 21/12 726/25 |
| 2010/0165997 | A1* | 7/2010 | Matsumoto | .........H04L 41/0806 370/400 |
| 2014/0050078 | A1* | 2/2014 | Sato | ....................H04L 41/0654 370/228 |

FOREIGN PATENT DOCUMENTS

| | | |
|---|---|---|
| JP | 2010-154383 A | 7/2010 |
| JP | 2010-239279 A | 10/2010 |

* cited by examiner

*Primary Examiner* — Phuongchau Ba Nguyen
(74) *Attorney, Agent, or Firm* — Volpe and Koenig, P.C.

(57) ABSTRACT

A communication path switching device is configured to determine whether or not a specified network device where exclusion from a communication path or addition to the communication path is specified through an input device can perform path switching based on the individual pieces of information on a coupling configuration and a presence or absence of an independent control function; refer to a storage device for the individual pieces of information on the coupling configuration and a coupling policy to change the coupling policy according to a result of the determination; and processing of issuing, according to the result of the determination and the individual pieces of information in the storage device, a path switching instruction to a network device having the independent control function and a network device not having the independent control function that are path switching targets on a communication path directed to the specified network device.

17 Claims, 24 Drawing Sheets

2116

| | P2a1 | P2a2 | P2a3 | P2a4 |
|---|---|---|---|---|
| PORT STATE | OPENED | OPENED | CLOSED | OPENED |

| | P2a1 | P2a2 | P2a3 | P2a4 |
|---|---|---|---|---|
| TRANSMISSION PROCESSING | OPERATED | OPERATED | STOPPED | OPERATED |
| RECEPTION PROCESSING | OPERATED | OPERATED | OPERATED | OPERATED |

| ACCESS PORT | UPLINK PORT | COUPLING POLICY |
|---|---|---|
| P2d3 P2d4 | P2d1 | ACTIVE SYSTEM |
| | P2d2 | ACTIVE SYSTEM |

FIG. 4C

| REDUNDANT GROUP NUMBER | COUPLING RELATIONSHIP ||||  COUPLING STATE |
|---|---|---|---|---|---|
| | MAINTENANCE CANDIDATE SWITCH || REDUNDANT BRANCH SWITCH || BEING COUPLED OR BEING EXCLUDED |
| | DEVICE IDENTIFIER | PORT | DEVICE IDENTIFIER | PORT | |
| 1 | SW2b | P2b1 | SW2a | P2a3 | BEING COUPLED |
| | SW2b | P2b2 | VSW2d | P2d1 | BEING COUPLED |
| | SW2c | P2c1 | SW2a | P2a4 | BEING COUPLED |
| | SW2c | P2c2 | VSW2d | P2d2 | BEING COUPLED |

| REDUNDANT GROUP NUMBER | MAINTENANCE CANDIDATE SWITCH || COUPLING REDUNDANT SWITCH ||
|---|---|---|---|---|
| | DEVICE IDENTIFIER | PORT | DEVICE IDENTIFIER | PORT |
| 1 | SW2b | – | – | – |
| | SW2c | – | – | – |

| DEVICE IDENTIFIER | TRANSMISSION AND RECEPTION PROCESSING INDEPENDENT CONTROL FUNCTION |
|---|---|
| SW2a | PRESENT |
| SW2b | PRESENT |
| SW2c | PRESENT |
| VSW2d | ABSENT |

| COUPLING DEVICE IDENTIFIER | POLICY IDENTIFIER | ACCESS PORT | UPLINK PORT | COUPLING POLICY |
|---|---|---|---|---|
| SW2a | 1 | P2a1 P2a2 | P2a3 | ACTIVE SYSTEM |
| | | | P2a4 | ACTIVE SYSTEM |
| VSW2d | 2 | P2d3 P2d4 | P2d1 | ACTIVE SYSTEM |
| | | | P2d2 | ACTIVE SYSTEM |

| REDUNDANT GROUP NUMBER | COUPLING RELATIONSHIP | | | | COUPLING STATE |
|---|---|---|---|---|---|
| | MAINTENANCE CANDIDATE SWITCH | | REDUNDANT BRANCH SWITCH | | BEING COUPLED OR BEING EXCLUDED |
| | DEVICE IDENTIFIER | PORT | DEVICE IDENTIFIER | PORT | |
| 1 | SW2b | P2b1 | VSW2a | P2a3 | BEING COUPLED |
| | | P2b2 | VSW2d | P2d1 | BEING COUPLED |
| | SW2c | P2c1 | VSW2a | P2a4 | BEING COUPLED |
| | | P2c2 | VSW2d | P2d2 | BEING COUPLED |

| REDUNDANT GROUP NUMBER | MAINTENANCE CANDIDATE SWITCH | | COUPLING REDUNDANT SWITCH | |
|---|---|---|---|---|
| | DEVICE IDENTIFIER | PORT | DEVICE IDENTIFIER | PORT |
| 1 | SW2b | P2b3 | SW2c | P2c3 |
| | SW2c | P2c3 | SW2c | P2b3 |

| DEVICE IDENTIFIER | TRANSMISSION AND RECEPTION PROCESSING INDEPENDENT CONTROL FUNCTION |
|---|---|
| VSW2a | ABSENT |
| SW2b | PRESENT |
| SW2c | PRESENT |
| VSW2d | ABSENT |

| COUPLING DEVICE IDENTIFIER | POLICY IDENTIFIER | ACCESS PORT | UPLINK PORT | COUPLING POLICY |
|---|---|---|---|---|
| VSW2a | 1 | P2a1 P2a2 | P2a3 | ACTIVE SYSTEM |
| | | | P2a4 | ACTIVE SYSTEM |
| VSW2d | 2 | P2d3 P2d4 | P2d1 | ACTIVE SYSTEM |
| | | | P2d2 | ACTIVE SYSTEM |
| | 3 | P2d5 | P2d1 | ACTIVE SYSTEM |
| | | | P2d2 | STANDBY SYSTEM |
| | 4 | P2d6 | P2d1 | STANDBY SYSTEM |
| | | | P2d2 | ACTIVE SYSTEM |

COMMUNICATION AMOUNT MANAGEMENT TABLE ⏎ 2108

| IF PORT<br>TIME | P2a3 | | P2a4 | |
|---|---|---|---|---|
| | TRANSMISSION | RECEPTION | TRANSMISSION | RECEPTION |
| T | 2,000,000,000 | 8,000,000,000 | 3,000,000,000 | 8,000,000,000 |
| T+α | 2,000,000,000 | 8,500,000,000 | 2,000,000,000 | 8,900,000,000 |
| T+2α | .. | .. | .. | .. |

FIG. 13

COMMUNICATION PATH SWITCHING DEVICE, COMMUNICATION PATH SWITCHING METHOD AND COMMUNICATION PATH SWITCHING PROGRAM

CROSS-REFERENCE TO RELATED APPLICATION

The disclosure of Japanese Patent Application No. 2013-93828 filed on Apr. 26, 2013 including the specification, drawings and abstract is incorporated herein by reference in its entirety.

BACKGROUND

The present invention relates to a communication path switching device, a communication path switching method and a communication path switching program, and more specifically relates to a technology that can suppress occurrence of a communication breakdown in maintaining a network device present on a redundant path.

In recent years, cloud computing and cloud service have been penetrating into society. Movement of aggregation of various types of systems such as a corporate system into a cloud data center is accelerated, and the cloud data center is becoming greater.

The provision form of cloud data center includes a public cloud. The public cloud is characterized in that it is a multi-tenant type in which a system of one or more tenants is accommodated on one cloud system. In such a multi-tenant environment, since each tenant expands various services on the cloud system, it is impossible to stop the cloud system in terms of convenience of a cloud operator.

For example, when a switch is inevitably stopped in order to maintain a network device such as a switch or a router, the stop of the switch may cause the stop of the cloud system itself. Hence, the cloud operator previously plans to stop the cloud system and notifies a method of the stop and a period of the stop to all tenants who might be affected by the stop of the cloud system; depending on the situation, the cloud operator needs to receive permission to stop the system from each tenant. The cloud operator needs to perform such an operation for each maintenance, which places a significant burden on the cloud operator. Hence, it is required to provide a measure for maintaining the switch without the stop of the cloud system.

Hence, as a prior art, for example, a technology (see Patent Document 1, Japanese Patent Application Laid-Open Publication No. 2010-239279) is proposed in which two switches are coupled through two paths, an active path and a standby path, and when a failure occurs in the active path, the standby path is used instead of the active path to switch a communication path.

Moreover, a technology (see Patent Document 2, Japanese Patent Application Laid-Open Publication No. 2010-154383) or the like is proposed in which in a plurality of active paths coupling two switches (hereinafter, a plurality of paths coupling two switches is referred to as a redundant path), a path through the switch of a maintenance target is detected, a communication path for transmission to the switch of the maintenance target is switched to another path and thus the switch of the maintenance target is excluded from an arbitrary communication path.

When the prior art (for example, the technology of Patent Document 1) described above is used to stop the switch arranged on the active path and thereby switch the active path to the standby system, in the active path, both transmission processing and reception processing of communication might be stopped. Here, it is likely that it is impossible to receive, on the active path, communication which is supposed to be originally received by the switch, due to the stop of the reception processing of the switch. Therefore, the communication can be disadvantageously interrupted on a temporary basis.

In the case (for example, the technology of Patent Document 2) of a technology without consideration given to the transmission processing and reception processing of communication at the time of switching of paths, the communication is disadvantageously interrupted when both the transmission processing and reception processing of communication are stopped at the time of switching of paths.

On the other hand, as another method of excluding the switch of the maintenance target on the redundant path from an arbitrary communication path, for example, a technology is proposed in which a technology (for example, a technology disclosed in Non-Patent Document 1, IEEE Computer Society, "IEEE Standard for Local and metropolitan area networks-Link Aggregation", IEEE [published on Nov. 3, 2008], [searched on Nov. 30, 2012], [Internet <URL: http://standards.ieee.org/getieee802/download/8020.1AX-2008.pdf>) where in two switches sandwiching the redundant path, the transmission processing and reception processing of communication are independently controlled is utilized to stop only the transmission processing while the reception processing of communication is being operated on one path, and thus the communication with the one path is switched to the other path without interruption of the communication.

However, in the switch needed in the technology disclosed in Non-Patent Document 1, that is, the switch having the function capable of independently controlling the transmission processing and reception processing of communication, the cost of the device is more expensive than that of a normal switch. Hence, not all switches that perform the switching of the paths on a network necessarily have such a function; in actuality, switches having such a function and switches not having such a function are probably present in a mixed manner.

In a case where the communication path is switched in such an environment, when in order to switch the communication on one path to the other, the switch which does not have the function capable of independently controlling the transmission processing and reception processing previously stops both the transmission processing and reception processing of the communication on the one path, the communication is temporarily interrupted by the stop of the reception processing of communication.

In an actual network system, whether a redundant path is set at an active system or at a standby system may be changed depending on the transmission source of communication (see Non-Patent Document 2, VMware Inc., "vSphere Networking Guide", VMware Inc., [date of issue is not disclosed] [searched on Feb. 19, 2013], [Internet <URL:http://pubs.vmware.com/vsphere-51/topic/com.vmware.ICbase/PDF/vsphere-esxi-vcenter-server-51-networking-guide.pdf>). In other words, in general, for the same redundant path, a plurality of different coupling policies such as only both the active systems, the active system and the standby system, and the standby system and the active system is set for each of the transmission sources of communication. Hence, it is easily expected that the prior art, in which the switching of the paths with consideration given to the coupling policies of the redundant path is not performed, cannot withstand the actual environment.

SUMMARY

Hence, an object of the present invention is to provide a technology that can suppress the occurrence of a communication breakdown in maintaining a network device present on a redundant path.

To solve the foregoing problem, a communication path switching device of the present invention includes: a storage device that stores individual pieces of information on a coupling configuration of network devices, a presence or absence of an independent control function of transmission and reception processing in each of the network devices, and a coupling policy of the network devices; and a computation device that performs: processing of determining whether or not a specified network device in which exclusion from a communication path or addition to the communication path is specified through an input device can perform path switching based on the individual pieces of information on the coupling configuration and the presence or absence of the independent control function; processing of referring to the storage device for the individual pieces of information on the coupling configuration and the coupling policy to change the coupling policy according to a result of the determination; and processing of issuing, according to the result of the determination and the individual pieces of information in the storage device, a path switching instruction to the network device having the independent control function and the network device not having the independent control function which are path switching targets on the communication path toward the specified network device.

A communication path switching method of the present invention is the one in an information processing device including a storage device that stores individual pieces of information on a coupling configuration of network devices, a presence or absence of an independent control function of transmission and reception processing in each of the network devices, and a coupling policy of the network devices, the method including: processing of determining whether or not a specified network device in which exclusion from a communication path or addition to the communication path is specified through an input device can perform path switching based on the individual pieces of information on the coupling configuration and the presence or absence of the independent control function; processing of referring to the storage device for the individual pieces of information on the coupling configuration and the coupling policy to change the coupling policy according to a result of the determination; and processing of issuing, according to the result of the determination and the individual pieces of information in the storage device, a path switching instruction to the network device having the independent control function and the network device not having the independent control function which are path switching targets on the communication path toward the specified network device.

A communication path switching program of the present invention causes an information processing device including a storage device that stores individual pieces of information on a coupling configuration of network devices, a presence or absence of an independent control function of transmission and reception processing in each of the network devices, and a coupling policy of the network devices, to perform: processing of determining whether or not a specified network device in which exclusion from a communication path or addition to the communication path is specified through an input device can perform path switching based on the individual pieces of information on the coupling configuration and the presence or absence of the independent control function; processing of referring to the storage device for the individual pieces of information on the coupling configuration and the coupling policy to change the coupling policy according to a result of the determination; and processing of issuing, according to the result of the determination and the individual pieces of information in the storage device, a path switching instruction to the network device having the independent control function and the network device not having the independent control function which are path switching targets on the communication path toward the specified network device.

According to the present invention, it is possible to suppress the occurrence of a communication breakdown in maintaining a network device present on a redundant path.

BRIEF DESCRIPTION OF THE DRAWINGS

FIG. 4A is a diagram showing a configuration example of a port state recording table included in the switch;

FIG. 4B is a diagram showing a configuration example of a transmission and reception state recording table included in the switch;

FIG. 4C is a diagram showing a configuration example of a coupling policy management table included in the switch;

FIG. 5A is a diagram showing a configuration example 1 of a redundant configuration management table included in the communication path switching device of the present embodiment;

FIG. 5B is a diagram showing a configuration example 1 of a redundant group management table included in the communication path switching device of the present embodiment;

FIG. 5C is a diagram showing a configuration example 1 of a switch characteristic management table included in the communication path switching device of the present embodiment;

FIG. 5D is a diagram showing a configuration example 1 of a switch coupling policy management table included in the communication path switching device of the present embodiment;

FIG. 5E is a diagram showing a configuration example 2 of the redundant configuration management table included in the communication path switching device of the present embodiment;

FIG. 5F is a diagram showing a configuration example 2 of the redundant group management table included in the communication path switching device of the present embodiment;

FIG. 5G is a diagram showing a configuration example 2 of the switch characteristic management table included in the communication path switching device of the present embodiment;

FIG. 5H is a diagram showing a configuration example 2 of the switch coupling policy management table included in the communication path switching device of the present embodiment;

FIG. 13 is a diagram showing a configuration example of a communication amount management table included in the communication path switching device of the present embodiment.

DETAILED DESCRIPTION

Figure 1:
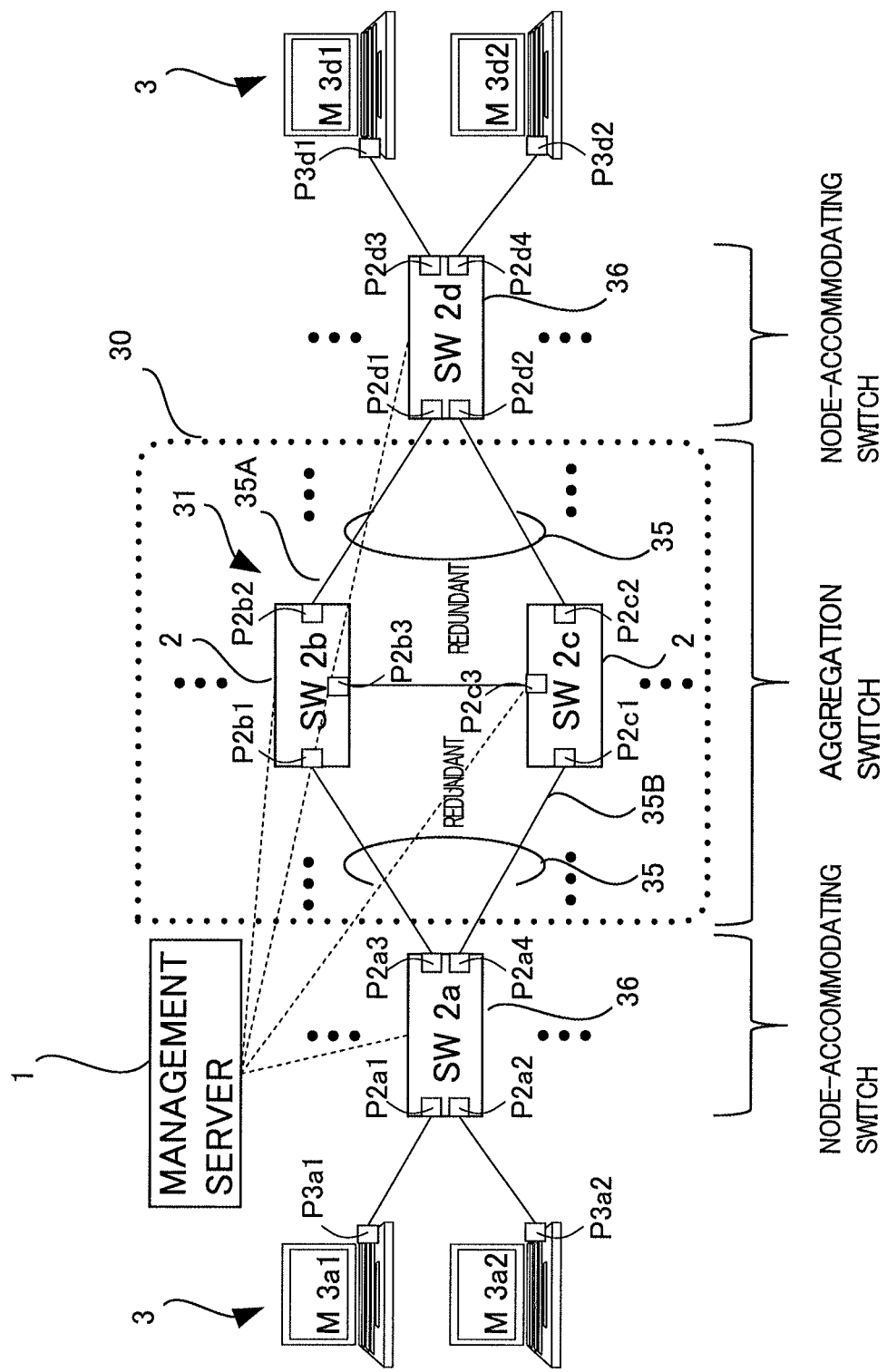
FIG. 1 is a diagram showing a network configuration including a communication path switching device of the present embodiment.

An embodiment of the present invention will be described in detail below with reference to accompanying drawings. FIG. 1 is a diagram showing a network configuration including a management server 1 that is a communication path switching device of the present embodiment. Although as a network device, there are various types, in the present embodiment, a description will be given using, as an example, a switch used in an Ethernet (registered trademark) layer.

In the network configuration shown in FIG. 1, a plurality of nodes such as a PC and a server, that is, a plurality of switches 2 which couple computers 3 is included. The computers 3 illustrated in the figure include M3$a$1, M3$a$2, M3$d$1 and M3$d$2. In the following description, when the computer 3 is indicated, as necessary, instead of the expression of the "computer", is attached. The switches 2 illustrated in the figure include SW2$a$, SW2$b$, SW2$c$ and SW2$d$. In the following description, when the switch 2 is indicated, as necessary, instead of the expression of the "switch", "SW" is attached.

In such a configuration, among the switches 2 coupled to the computers 3, SW2$a$ and SW2$d$ are node-accommodating switches, and SW2$b$ and SW2$c$ that are switches present between arbitrary two node-accommodating switches are aggregation switches. Hence, in the present embodiment, it is assumed that a path 35A coupling SW2$a$, SW2$b$ and SW2$d$ and a path 35B coupling SW2$a$, SW2$c$ and SW2$d$ form a redundant path 35, and SW2$b$ and SW2$c$ are made redundant. In this case, SW2$a$ and SW2$d$, which are the node-accommodating switches present at terminal ends of the paths 35A and 35B are redundant branch switches 36.

Under conditions in which as described above, a plurality of paths 35A and 35B through different switches is present between SW2$a$ and SW2$d$, which are arbitrary two node-accommodating switches and the redundant branch switches 36, the switches present at points where a plurality of paths 35A and 35B is intersected are the aggregation switches. In the example of FIG. 1, SW2$a$ and SW2$d$ are the aggregation switches. A group of aggregation switches on the respective paths 35A and 35B is referred to as a redundant group 30.

The aggregation switches belonging to the redundant group 30 are maintenance candidate switches 31. Hence, SW2$b$ and SW2$c$ fall under the maintenance candidate switches 31. The configuration between SW2$b$ and SW2$c$, which are the maintenance candidate switches 31, may be achieved by MC-LAG (which is an abbreviation of Multi-Chassis Link Aggregation or may be referred to as MLAG) that is a technology which can logically regard a plurality of paths 35A and 35B coupled to a plurality of computers 3 as one path. One or more of SW2$b$ and SW2$c$, which are the aggregation switches, are the maintenance candidate switches.

On one path between the arbitrary node-accommodating switches SW2$a$ and SW2$b$, a plurality of maintenance candidate switches may be present or three or more paths 35 that are made redundant may be present. The number of node-accommodating switches may be three or more. However, all these switches 2 are coupled to the management server 1, and this coupling may not be achieved by physically independent links as long as these switches and the management server 1 can communicate with each other. For example, P2$a$1 to P2$a$4 of SW2$a$ shown in the figure indicate network interface ports (hereinafter referred to as ports) that couple the switches.

Figure 2A:
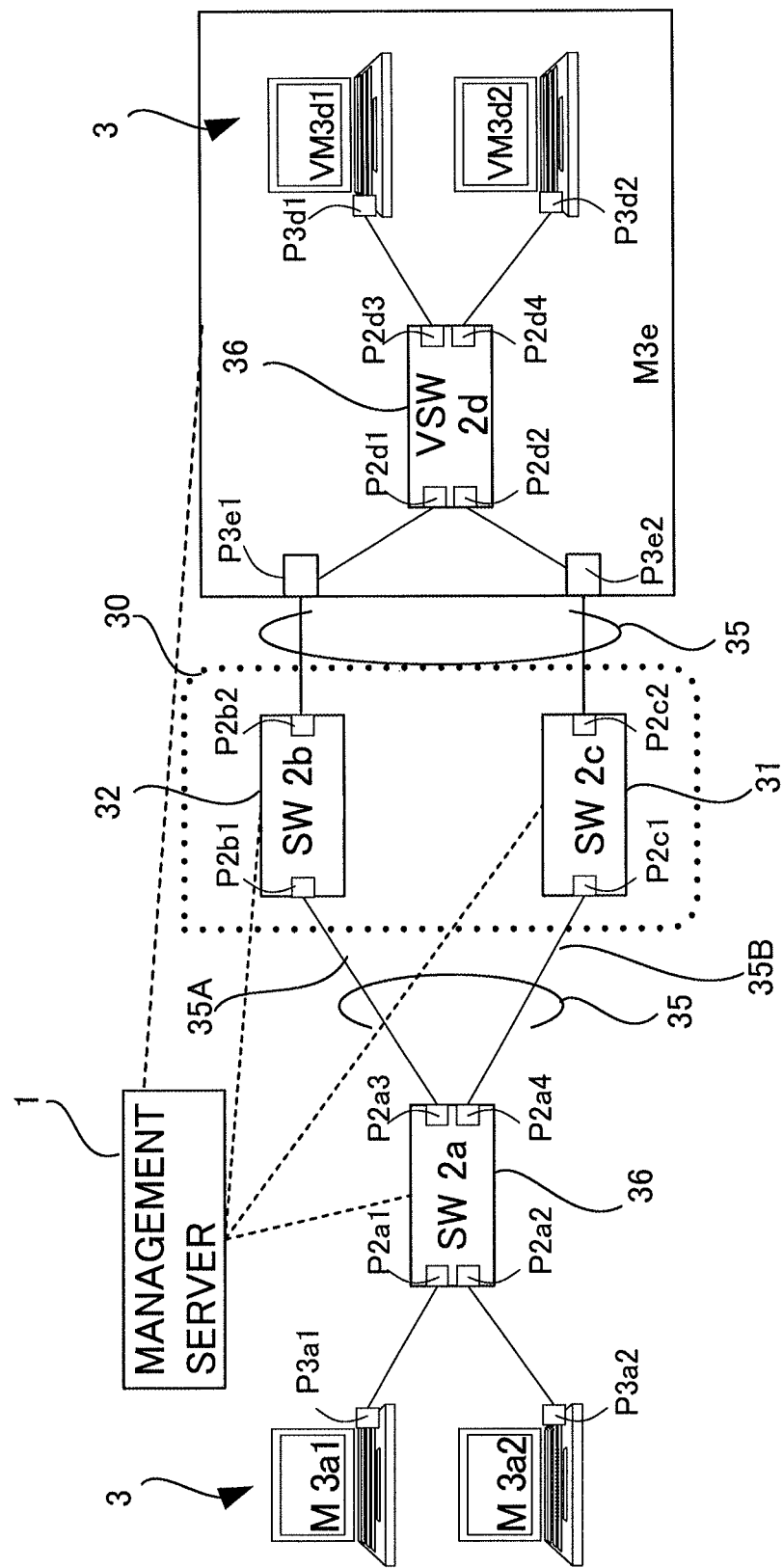
FIG. 2A is a diagram showing a network configuration example 1 including the communication path switching device of the present embodiment.
Figure 2B:
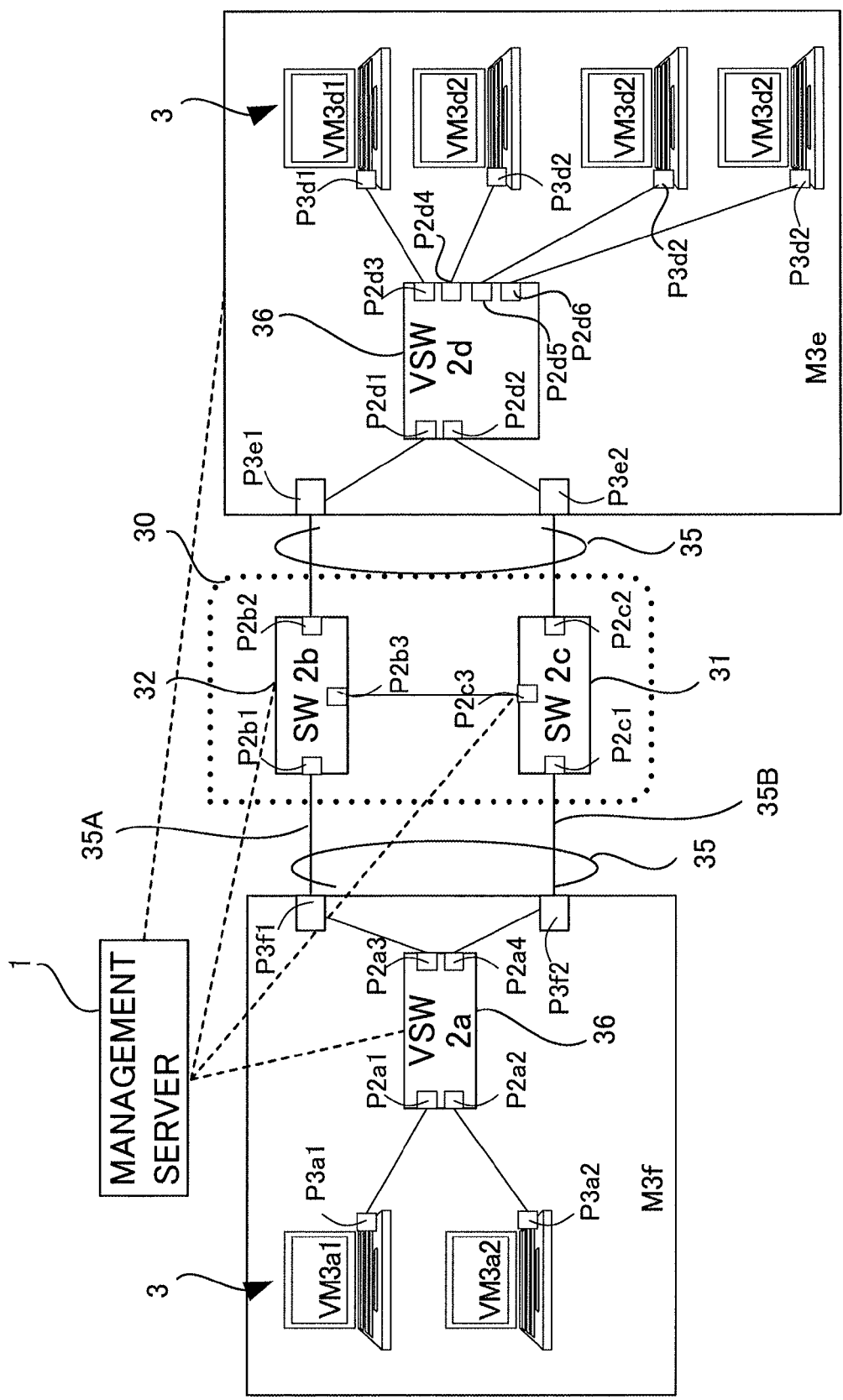
FIG. 2B is a diagram showing a network configuration example 2 including the communication path switching device of the present embodiment.

The network systems shown in FIGS. 2A and 2B are more specific examples of the configuration of the network system shown in FIG. 1. Among them, FIG. 2A is a diagram showing a network configuration example 1 including the communication path switching device of the present embodiment; FIG. 2A shows, for example, an example where SW2$b$ and SW2$c$ that are maintenance candidate switches 32 of the redundant group 30 are coupled to SW2$a$, which is a physical switch that is the redundant branch switch 36 and VSW2*d* that is a virtual switch (hereinafter, the virtual switch is referred to as VSW).

In such a configuration, SW2*a* is coupled to M3*a*1 and M2*a*2, and VSW2*d* is coupled to VM3*d*1 and VM3*d*2 that are virtual machines (hereinafter, the virtual switch is referred to as VM). The virtual machine and the virtual switch are virtual computers that are constructed by a program executed in the memory of the machine utilizing hardware resources.

FIG. 2B is a diagram showing a network configuration example 2 including the communication path switching device of the present embodiment; FIG. 2B shows, for example, an example where SW2*b* and SW2*c* that are the maintenance candidate switches 32 of the redundant group 30 are coupled to VSW2*a* and VSW2*d* that are the redundant branch switches 36. SW2*b* and SW2*c* are configured by MC-LAG. VSW2*a* is coupled to VM3*a*1 and VM2*a*2, and VSW2*d* is coupled to VM3*d*1, VM3*d*2, VM3*d*3 and VM3*d*4.

The configuration to which the present embodiment is applied may be a network system that is configured by only physical switches or a network system in which physical switches and virtual switches are mixed as shown in FIG. 2B.

Figure 3A:
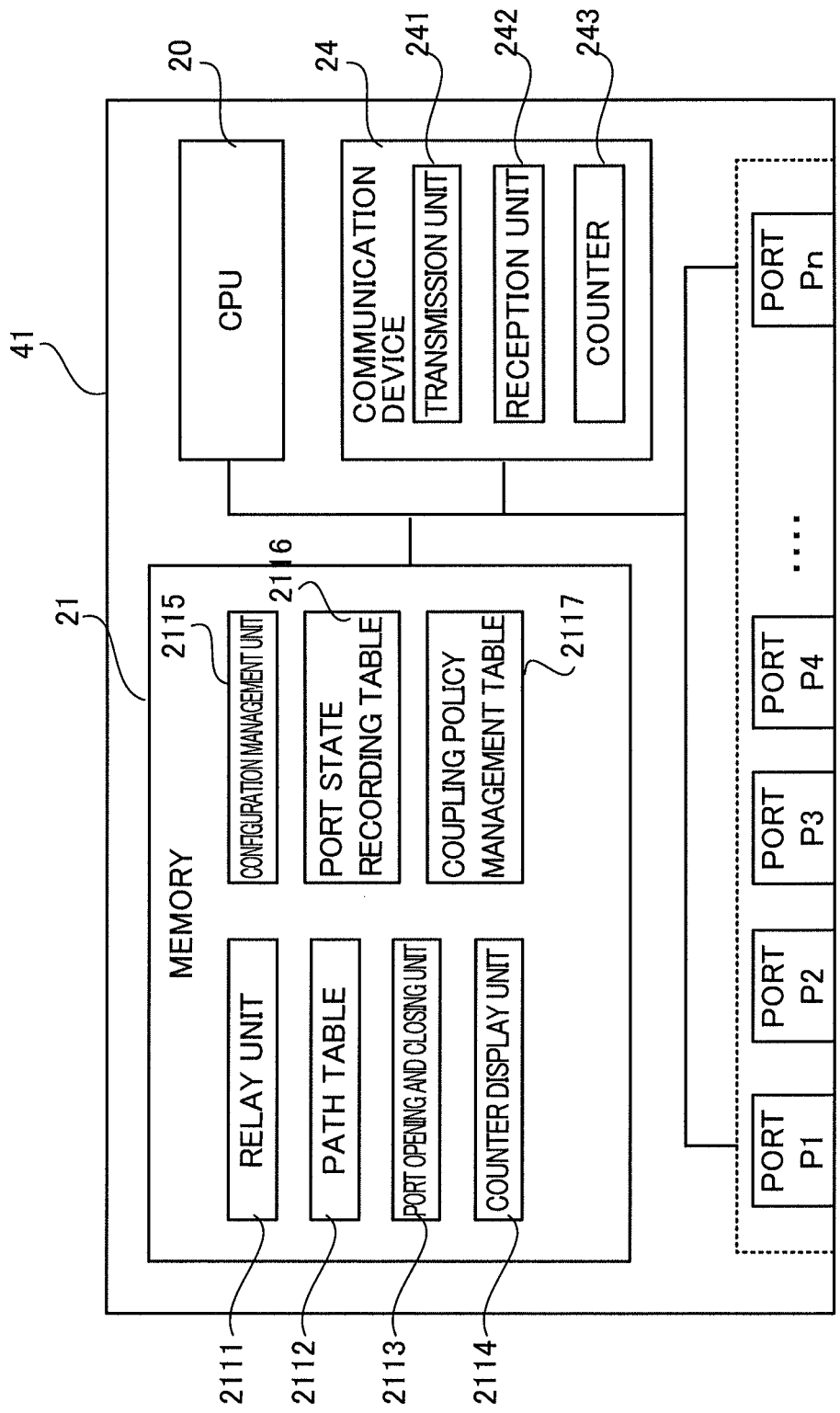
FIG. 3A is a diagram showing a functional configuration of a switch that is a network device.

Then, the configuration of the switch 2 in the present embodiment will be described. FIG. 3A is a diagram showing a functional configuration of the switch 2, which is the network device. This switch includes a CPU 20, a memory 21, a communication device 24 and one or more ports Pn (n=1, 2, 3 . . . ), and has a configuration in which they are coupled by an internal bus.

In the memory 21 among them, a program and data for realizing the functions implemented by the switch 2 are stored, and these program and data are read and executed by the CPU 20 to exhibit the function as the switch 2 of the present embodiment. The program and data described above may be previously stored in the memory 21 or may be stored in another storage device (not shown in the figure), which is coupled by the internal bus, as in the memory. The program and data may be input to the switch through a predetermined interface from an external medium such as an SD memory card or a CD-ROM. The function realized by the program may be realized by dedicated hardware (such as an electronic circuit).

The communication device 24 includes a transmission unit 241, a reception unit 242 and a counter 243, and is a device for performing transmission and reception of communication with other devices through the ports Pn; for example, the communication device 24 performs communication in conformity with Ethernet (registered trademark) standard specified by IEEE802.3. The reception unit 242 passes communication received through the individual ports Pn to a relay unit 2111 (described later), and the transmission unit 241 transmits the communication received from the relay unit 2111 through the individual ports Pn. The counter 243 counts the number of small bundles of information called packets so as to grasp the amount of communication transmitted and received through the individual ports Pn. The CPU 20 executes the processes in the programs stored in the memory 21.

The functions implemented in the memory 21 by the CPU 20 will now be described. Among them, the relay unit 2111 records, in a path table 2112 (which is generally included in a switch that is a network device), information or the like on the MAC address of the transmission source of communication and the interface port Pn through which the communication is received when the communication is received through the reception unit 242 described above. This is called the learning of the path table. When the communication is performed through the transmission unit 241, the MAC address that is the destination of the communication is checked against MAC addresses recorded in the path table 2112, and thus the port Pn through which the communication is transmitted is identified. A port opening and closing unit 2113 has the function of closing and opening the port Pn to interrupt and start the communication processed by the relay unit 2111.

A counter display unit 2114 has the function of displaying the number of packets in the communication counted by the counter 243 within the communication device 24. A configuration management unit 2115 grasps the opened and closed state of the port of its own switch, and uses an LLDP (Link Layer Discovery Protocol) specified by IEEE802.1ab to acquire information on the coupled switch. A port state recording table 2116 is a table on which the opened and closed condition of each port Pn is recorded. In a coupling policy management table 2117, as a policy in an uplink port coupled to each of the paths 35A and 35B that are made redundant from the redundant branch switch 36, whether the uplink port coupled to the path concerned is the active system or the standby system is recorded.

Figure 3B:
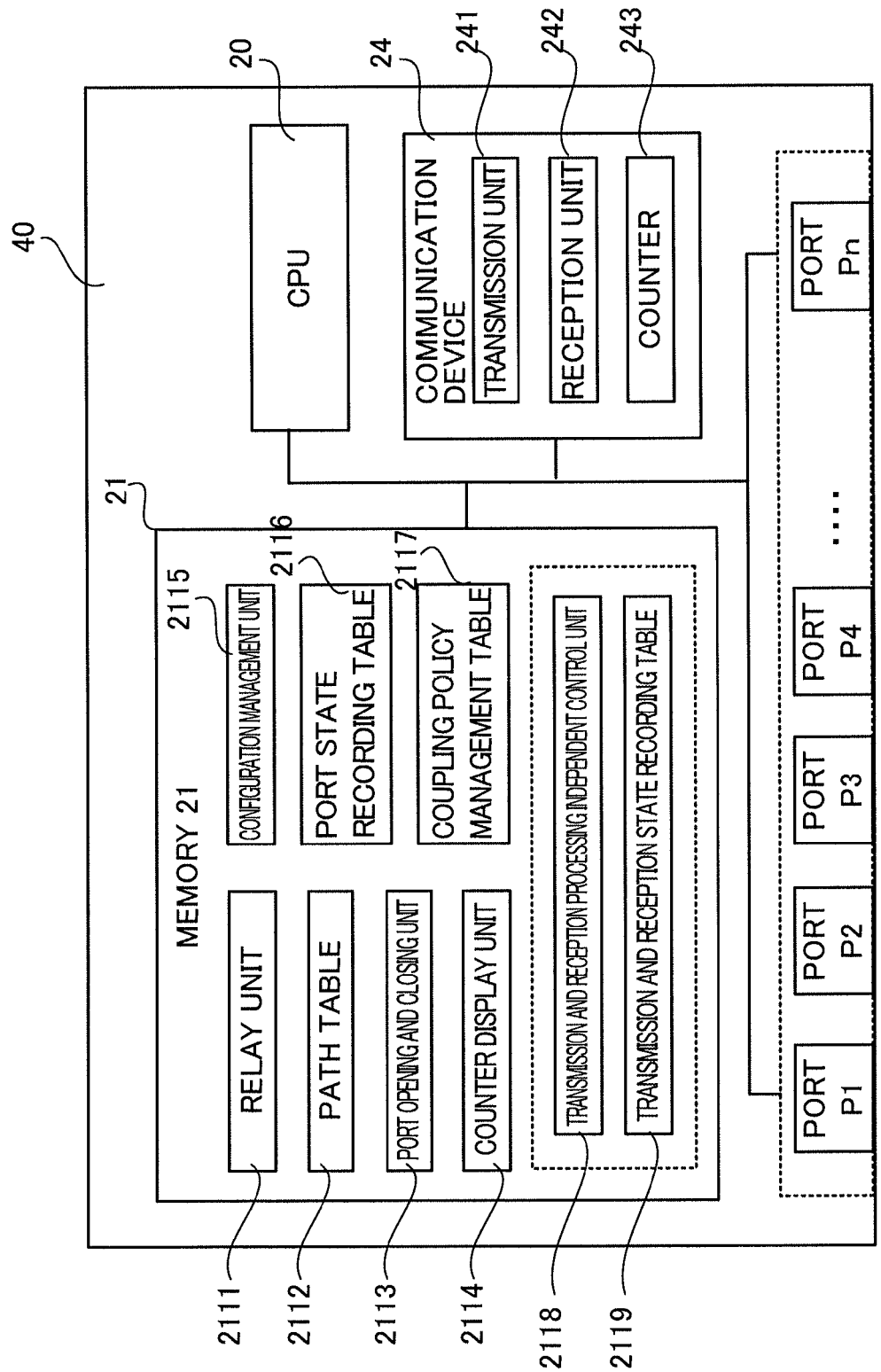
FIG. 3B is a diagram showing a functional configuration of a switch having a transmission and reception processing independent control function.

On the other hand, FIG. 3B shows a functional configuration of the switch 2 having a transmission and reception processing independent control function, and shows a configuration in which a transmission and reception processing independent control unit 2118 and a transmission and reception state recording table 2119 are added to the configuration of the switch 2 shown in FIG. 3A. Here, the transmission and reception processing independent control function refers to a function capable of independently controlling transmission processing and reception processing in a switch that is a network device, using the technology described in Non-Patent Document 1, for example.

In the switch 2 shown in FIG. 3B, the port opening and closing unit 2113 has the function of opening or closing the port to interrupt or start the communication. Although in the switch 2 shown in FIG. 3A, it is only possible to perform the transmission processing and the reception processing at a time, in the switch 2 shown in FIG. 3B, the transmission and reception processing independent control unit 2118 is included, and thus it is possible to independently control the transmission processing and the reception processing of the communication. In other words, it is possible to stop only one of the transmission processing and the reception processing. The transmission and reception state recording table 2119 is a table on which the operated condition of each of the transmission processing and the reception processing of each port Pn is recorded.

When the switch 2 shown in each of FIGS. 3A and 3B is the redundant branch switch 36, the switch 2 including the transmission and reception processing independent control function described above is a redundant branch switch 40 having the independent control function, and the switch 2 having no reception processing independent control function is a redundant branch switch 41 having no independent control function.

Figure 3C:
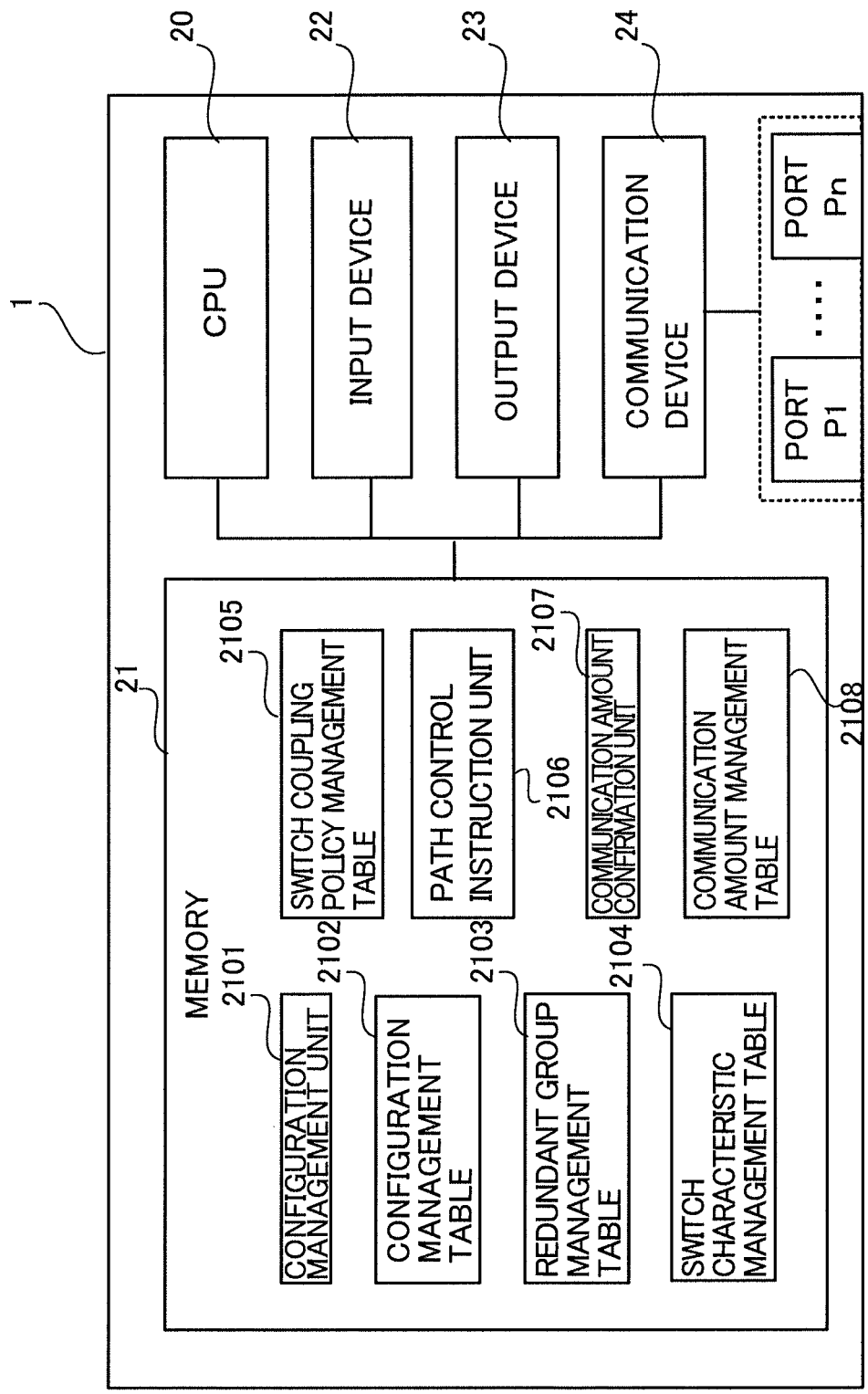
FIG. 3C is a diagram showing a functional configuration of a management server that is the communication path switching device of the present embodiment.

The management server 1 of the present embodiment will now be described. FIG. 3C is a diagram showing a functional configuration of the management server 1 that is a communication path switching device of the present embodiment. The management server 1 includes the CPU 20, the memory 21, an input device 22, an output device 23, the communication device 24 and one or more ports Pn (n=1, 2, 3 . . . ), and has a configuration in which they are coupled by the internal bus.

In the memory 21 among them, programs and data for realizing the functions implemented by the management server 1 are stored, and these programs and data are read and executed by the CPU 20 to exhibit the functions as the communication path switching device of the present embodiment. The programs and data described above may be previously stored in the memory 21 or may be stored in another storage device (not shown in the figure) that is coupled by the internal bus, as in the memory. The programs and data may be input to the management server 1 through a predetermined interface from an external medium such as an SD memory card or a CD-ROM. The functions realized by the programs may be realized by dedicated hardware (such as an electronic circuit).

The input device 22 is, for example, a device for receiving an instruction from a user, and an input device such as a mouse or a keyboard; the output device 23 is a device, such as a display, for outputting a state of user input and a result of processing performed on the memory 21 to a management screen or the like. The communication device 24 is a device for transmitting and receiving communication with the switches 2 through the ports Pn, and performs the communication in conformity with the Ethernet (registered trademark) standard specified by IEEE802.3. The CPU 20 executes the processes in the programs stored in the memory 21.

The functions implemented in the memory 21 by the CPU 20 in the management server 1 will now be described. Among them, a configuration management unit 2101 is a processing unit that manages the configuration of the network necessary for performing path control on the switch 2 of the present embodiment. Specifically, for each redundant group 30, the network configuration is grasped by reading a redundant configuration management table 2102 showing a relationship of coupling between the maintenance candidate switch 31 and the redundant branch switch 36, a redundant group management table 2103 showing a relationship of coupling between the maintenance candidate switches 31 within the same redundant group 30, a switch characteristic management table 2104 showing the presence or absence of the transmission and reception processing independent control function and a switch coupling policy management table 2105 showing a coupling policy (the active system or the standby system) for the uplink ports of the redundant branch switch 36.

A path control instruction unit 2106 instructs the redundant branch switch 36 to switch the paths so that the maintenance candidate switch 32 is excluded from the communication path or is added to the communication path. A communication amount confirmation unit 2107 acquires the value of the amount of communication flowing through the switch concerned from each switch 2, and records it in a communication amount management table 2108. The communication device 24 transmits, when the communication is performed, information to the switch 2 and the like coupled through the port Pn, and receives information from the switch 2 and the like through the port Pn.

Then, an example of the data structure of the tables utilized by the switch 2, the management server 1 and the like will be described. FIG. 4A is a diagram showing a configuration example of a port state recording table 2116 included in the switch 2, and specifically shows a configuration example of the port state recording table 2116 included in SW2a. In this case, SW2a is the redundant branch switch 41 having no transmission and reception processing independent control function.

In this case, the port state recording table 2116 is a table showing whether or not each port Pn of the switch 2 is opened (a state where communication can be performed) or is closed (a state where communication cannot be performed). For example, communication is performed between M3a1 and M3d1 shown in FIG. 1, and here, the state of all the ports of SW2a is opened. Thereafter, at certain timing, the port opening and closing unit 2113 of SW2a is assumed to change, as shown in FIG. 4A, P2a3 to a closed state. Then, the communication processing of P2a3 of SW2a is closed. Here, in the communication from M3a1 to M3d1, communication transmitted from P2a3 of SW2a is transmitted from P2a4. On the other hand, in the communication from M3d1 to M3a1, communication transmitted from P2d1 of SW2d is continuously transmitted from P2d1 until the learning of the path table 2112 is performed in SW2d. Hence, in P2b1 of SW2b coupled to P2a3 of SW2a in which the state of the port is closed, the interruption of the communication occurs.

On the other hand, FIG. 4B is a diagram showing the transmission and reception state management table 2119 of SW2a as the redundant branch switch 40 having the transmission and reception processing independent control function. In this case, the transmission and reception processing state recording table 2119 is a table showing whether in each port Pn of the switch, each of the transmission processing and the reception processing is operated (a state where communication can be performed) or is stopped (a state where communication cannot be performed).

For example, communication is performed between M3a1 and M3d1 shown in FIG. 1, and at certain timing, the transmission and reception processing independent control unit 2118 of SW2a is assumed to change, as shown in FIG. 4B, the transmission processing of P2a3 to a stopped state. Then, only the transmission processing of P2a3 of SW2a is stopped. Here, in the communication from M3a1 to M3d1, communication transmitted from SW2a to P2a3 is transmitted from P2a4. On the other hand, in the communication from M3d1 to M3a1, communication transmitted from P2d1 of SW2d is received by P2b2 of SW2b, is transmitted from P2b1 of the same switch and is received by P2a3 of SW2a. Here, since although in P2a3 of SW2a, the transmission processing is stopped, the reception processing is kept operated, the communication from M3c to M3a is continued without being interrupted. After this processing is performed, the transmission processing of P2d1 is stopped in SW2d, and thus it is possible to exclude the path through SW2b from the communication path without the occurrence of at least communication interruption caused by performing the communication with the closed port as described on FIG. 3A.

FIG. 4C is a diagram showing a configuration example of the coupling policy management table 2117 included in the switch 2. Here, among the switches 2, an example of the coupling policy management table 2117 retained by SW2d of the redundant branch switch 36 is shown. In the coupling policy management table 2117, whether the uplink port coupled to each of the communication paths 35A and 35B made redundant is the active system or the standby system in the switch concerned is recorded.

A structure example of the tables utilized by the management server 1 will now be described. FIGS. 5A to 5D are diagrams showing the tables held in the management server 1 in the configuration shown in FIG. 2A. Among them, FIG. 5A is a diagram showing a configuration example 1 of the redundant configuration management table 2102 included in the communication path switching device of the present embodiment. The redundant configuration management table 2102 is a matrix showing a relationship of coupling between the ports Pn of the maintenance candidate switch 31 and the redundant branch switch 36. For example, the relationship of coupling between the ports Pn may be checked manually or may be checked by acquiring data information stored in each switch by the LLDP from each switch using a protocol in conformity with, for example, an SNMP (Simple Network Management Protocol).

In the redundant configuration management table 2102, in a coupled state column, a value is set that indicates whether the individual ports coupled between the maintenance candidate switch 31 and each of the redundant branch switches 36 are being coupled (a state where the exclusion processing from the communication path in the present embodiment is not performed and it is possible to perform communication) or are being excluded (a state where the exclusion processing from the communication path in the present embodiment has already been performed and it is impossible to perform communication).

FIG. 5B is a diagram showing a configuration example 1 of the redundant group management table 2103 included in the communication path switching device of the present embodiment. The redundant group management table 2103 is a table on which for each redundant group 30, a value is set that indicates whether or not the maintenance candidate switch 31 is coupled to another maintenance candidate switch 31 within the same redundant group 30. Hence, in the present table showing the configuration of FIG. 2A, a column in which information on the other maintenance candidate switch 31 of the coupling destination as seen from one maintenance candidate switch 31 is set, that is, a coupling redundant switch column is empty.

FIG. 5C is a diagram showing a configuration example 1 of the switch characteristic management table 2104 included in the communication path switching device of the present embodiment. In the switch characteristic management table 2104, a value ("present" or "absence") indicating whether or not the switches 2 present within the network system include the transmission and reception processing independent control function is set. Although in the example shown in FIG. 5C, the virtual switch is assumed to be a switch that does not have the function concerned, a difference between the physical switch and the virtual switch is not necessarily linked to the presence or absence of the function concerned.

FIG. 5D is a diagram showing a configuration example 1 of the switch coupling policy management table 2105 included in the communication path switching device of the present embodiment. The switch coupling policy management table 2105 is a table on which for each redundant branch switch 36, a value indicating whether the uplink port is the active system or the standby system is stored as the policy. Among them, in an access port column, values of the ports Pn of the redundant branch switches 36 coupled to the computers 3 to which the individual policies are applied are set. In an uplink port column, values of the ports Pn of the redundant branch switches 36 coupled to a plurality of paths 35A and 35B made redundant are set. In a coupling policy column, values indicating whether the uplink port is the active system or the standby system are set.

On the other hand, FIGS. 5E to 5H are diagrams showing tables held in the management server 1 in the network configuration shown in FIG. 2B. Although the structures of the tables are substantially the same as shown in FIGS. 5A to 5D, the redundant group management table 2103 differs from that shown in FIG. 5B in the data configuration.

In a configuration example 2 of the redundant group management table 2103 shown in FIG. 5F, in order to correspond to the network configuration of FIG. 2B, the column in which the information on the other maintenance candidate switch 31 of the coupling destination as seen from one maintenance candidate switch 31 is set, that is, the coupling redundant switch column is not empty but a value on the other maintenance candidate switch 31 within the same redundant group 30 to which the maintenance candidate switch 31 is coupled for each redundant group 30 is set. In the configuration of the redundant group management table 2103 illustrated in FIG. 5F, in a maintenance candidate switch column, the value of the port P2$b$3 of SW2$b$ is set, and in the coupling redundant switch column, the value of the port P2$c$3 of SW2$c$ that is the other maintenance candidate switch 31 is set.

Then, the actual procedure of a communication path switching method in the present embodiment will be described with reference to the drawings. Various types of operations corresponding to the communication path switching method, which will be described below, are realized by a program that is read in the memory or the like and is executed by the management server 1. The program is formed with codes for performing the various types of operations, which will be described below.

Figure 6:
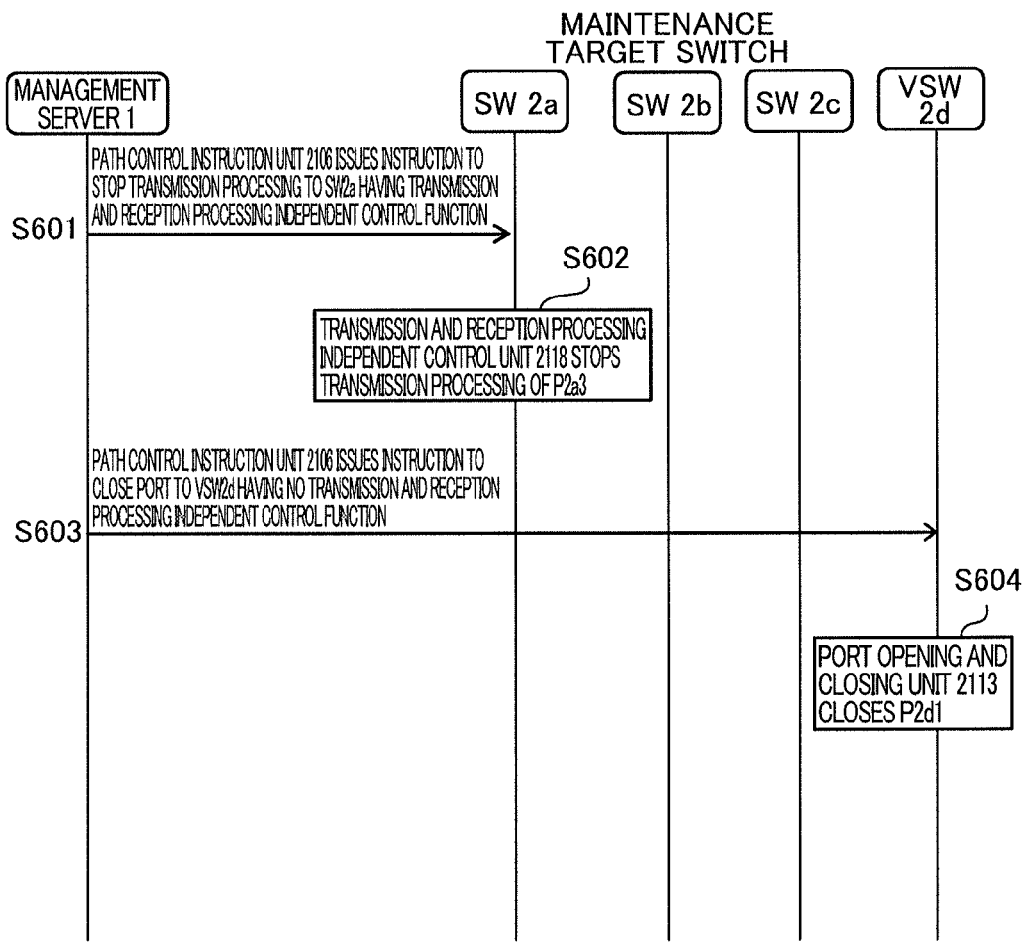
FIG. 6 is a sequence diagram showing a processing procedure example 1 of a communication path switching method in the present embodiment.

FIG. 6 is a sequence diagram showing a processing procedure example 1 of the communication path switching method in the present embodiment. Here, in the network configuration shown in FIG. 2A, processing is shown that switches, to another path, communication with the path coupled to a maintenance candidate switch performing the maintenance (hereinafter, the maintenance target switch 32) in the redundant branch switch 36 in order to perform the maintenance on the maintenance candidate switch 31 present on a certain redundant path. This processing is referred to as exclusion of the maintenance target switch 32 from the communication path.

This sequence shows processing in which the management server 1 issues an instruction of the path control to SW2$a$ that is the redundant branch switch 40 having the transmission and reception processing independent control function and to VSW2$d$ that is the redundant branch switch having no transmission and reception processing independent control function in order to exclude, from the communication path 35A, SW2$b$ that is the maintenance target switch 32. In the present configuration, in order to prevent communication interruption caused by communication with the closed port (P2$d$1 of VSW2$d$) of the redundant branch switch 41 having no transmission and reception processing independent control function, the path control instruction to SW2$a$ that is the redundant branch switch 40 having the transmission and reception processing independent control function is performed, and thereafter the path control processing is performed on VSW2$d$ having no transmission and reception processing independent control function.

In this case, the path control instruction unit 2106 of the management server 1 issues, to SW2$a$ having the transmission and reception processing independent control function, an instruction to stop the transmission processing on the port P2$a$3 coupled to SW2$b$ that is the maintenance target switch 32 (S601). On reception of this, the transmission and reception processing independent control unit 2118 of SW2$a$ stops the transmission processing on P2$a$3 (S602).

Then, the path control instruction unit 2106 of the management server 1 issues, to VSW2$d$ having no transmission and reception processing independent control function, an instruction to close the port P2$d$1 coupled to SW2$b$ that is the maintenance target switch 32 (S603). On reception of this, the port opening and closing unit 2113 of VSW2*d* closes P2*d*1 (S604).

Figure 7:
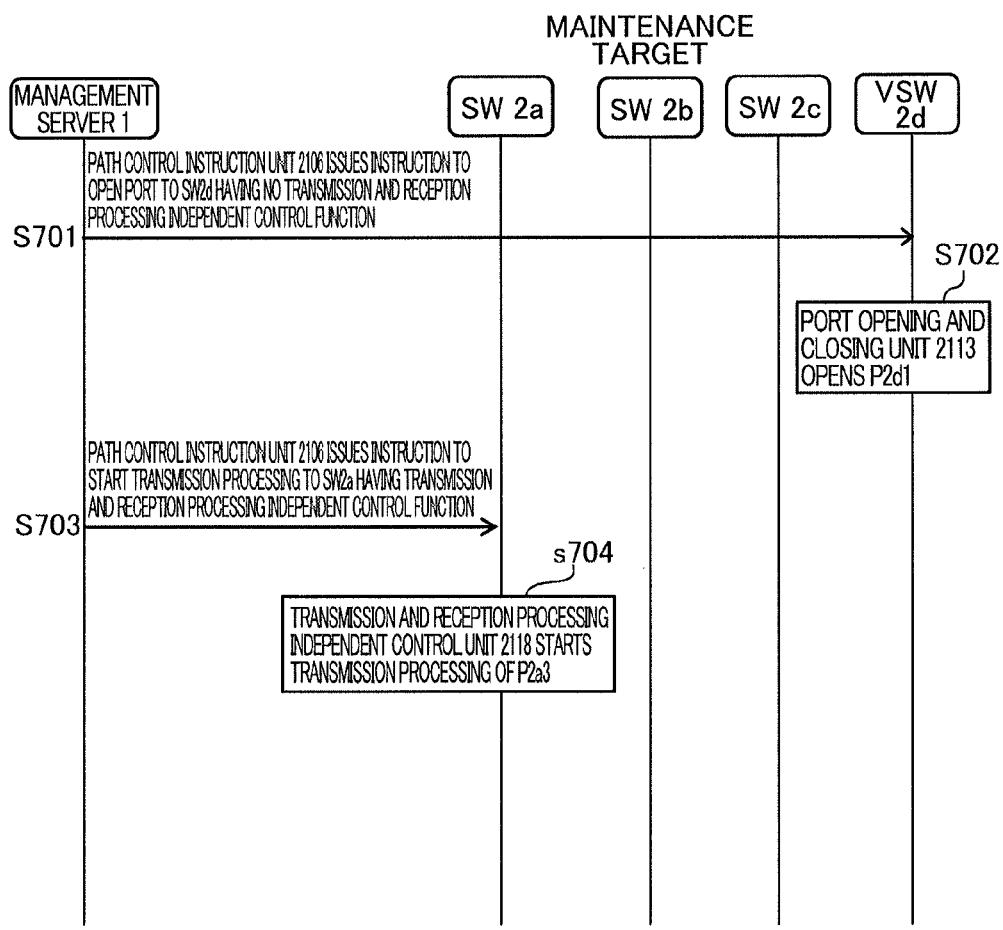
FIG. 7 is a sequence diagram showing a processing procedure example 2 of the communication path switching method in the present embodiment.

Then, in the network configuration of FIG. 2A, processing is shown that switches communication with the path coupled to the maintenance target switch 32 to the original path in order to temporarily return again the maintenance target switch 32 excluded from the communication path 35A to the communication path 35A. This processing is referred to as adding of the maintenance target switch 32 to the communication path 35A. FIG. 7 is a sequence diagram showing a processing procedure example 2 of the communication path switching method in the present embodiment.

This sequence shows processing in which the management server 1 issues an instruction of the path control to SW2*a* that is the redundant branch switch 40 having the transmission and reception processing independent control function and to VSW2*d* that is the redundant branch switch having no transmission and reception processing independent control function in order to add, to the communication path 35A, SW2*b* that is the maintenance target switch 32. In order to prevent communication interruption caused by the communication with the closed port (P2*d*1 of VSW2*d*) of the redundant branch switch 41 having no transmission and reception processing independent control function, the path switching is performed in the order opposite to the sequence shown in FIG. 6.

In this case, the path control instruction unit 2106 of the management server 1 issues an instruction to open the port to the port opening and closing unit 2113 of VSW2*d* coupled to SW2*b* that is the maintenance target switch 32 (S701) and having no transmission and reception processing independent control function. On reception of this, the port opening and closing unit 2113 of VSW2*d* opens P2*d*1 linked to SW2*b* (S702).

The path control instruction unit 2106 of the management server 1 issues an instruction to start the transmission processing to the transmission and reception processing independent control unit 2118 of SW2*a* coupled to SW2*b* that is the maintenance target switch 32 and having the transmission and reception processing independent control function (S703). On reception of this, the transmission and reception processing independent control unit 2118 of SW2*a* starts the transmission processing on the port P2*a*3 linked to SW2*b* (S704).

Figure 8:
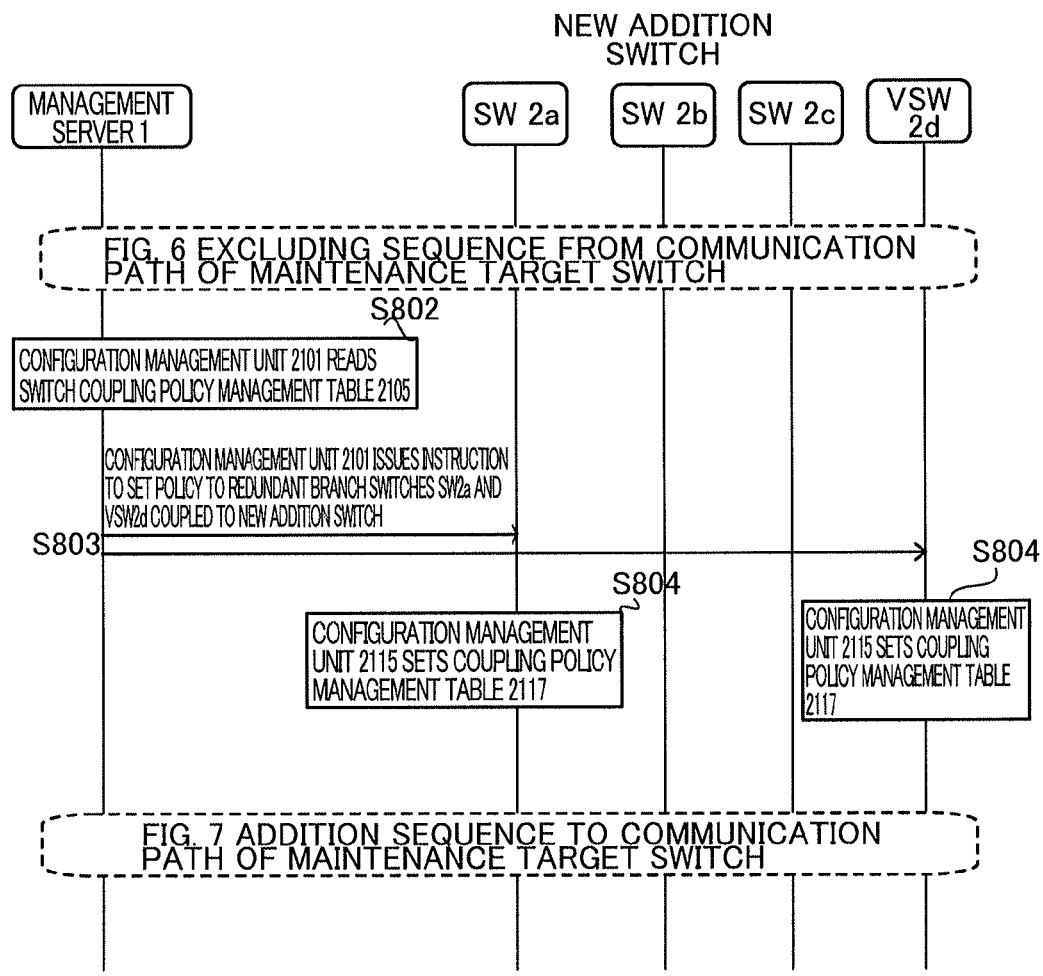
FIG. 8 is a sequence diagram showing a processing procedure example 3 of the communication path switching method in the present embodiment.

Then, in the network configuration of FIG. 2A, processing is shown which produces a new redundant path by coupling a new switch to the redundant branch switch 36. The new switch described above is referred to as a new addition switch, and this processing is referred to as adding of the new addition switch to the communication path. FIG. 8 is a sequence diagram showing a processing procedure example 3 of the communication path switching method in the present embodiment.

This sequence shows processing in which the management server 1 issues an instruction of the path control to SW2*a* that is the redundant branch switch 40 coupled to the new addition switch and having the transmission and reception processing independent control function and to VSW2*d* that is the redundant branch switch 41 having no transmission and reception processing independent control function in order to add the new addition switch described above to the communication path.

In this case, the management server 1 regards the new addition switch as the maintenance target switch 32, and first performs the sequence of excluding the maintenance target switch 32 from the communication path 35A, which is shown in FIG. 6 (S801). This previously prevents the redundant branch switch 36 coupled to the new addition switch from communicating with the new addition switch.

Then, the configuration management unit 2101 reads the switch coupling policy management table 2105 (S802). Here, it is assumed that the coupling policy management table 2105 of the new addition switch is previously set by the user.

Then, the configuration management unit 2101 issues, to SW2*a* and VSW2*d* which are the redundant branch switches coupled to the new addition switch, a request for setting a policy corresponding to the coupling policy of the new addition switch read in step S802 described above (S803). The policy shown by this setting request indicates whether the uplink port of the new addition switch is the active system or the standby system.

On the other hand, the configuration management unit 2115 of SW2*a* and VSW2*d* registers, in its own coupling policy management table 2117, the above policy specified by the management server 1 (S804). Thereafter, the management server 1 regards the new addition switch described above as the maintenance target switch 32, and performs an additional sequence on the communication path of the maintenance target switch shown in FIG. 7 (S805).

Figure 9:
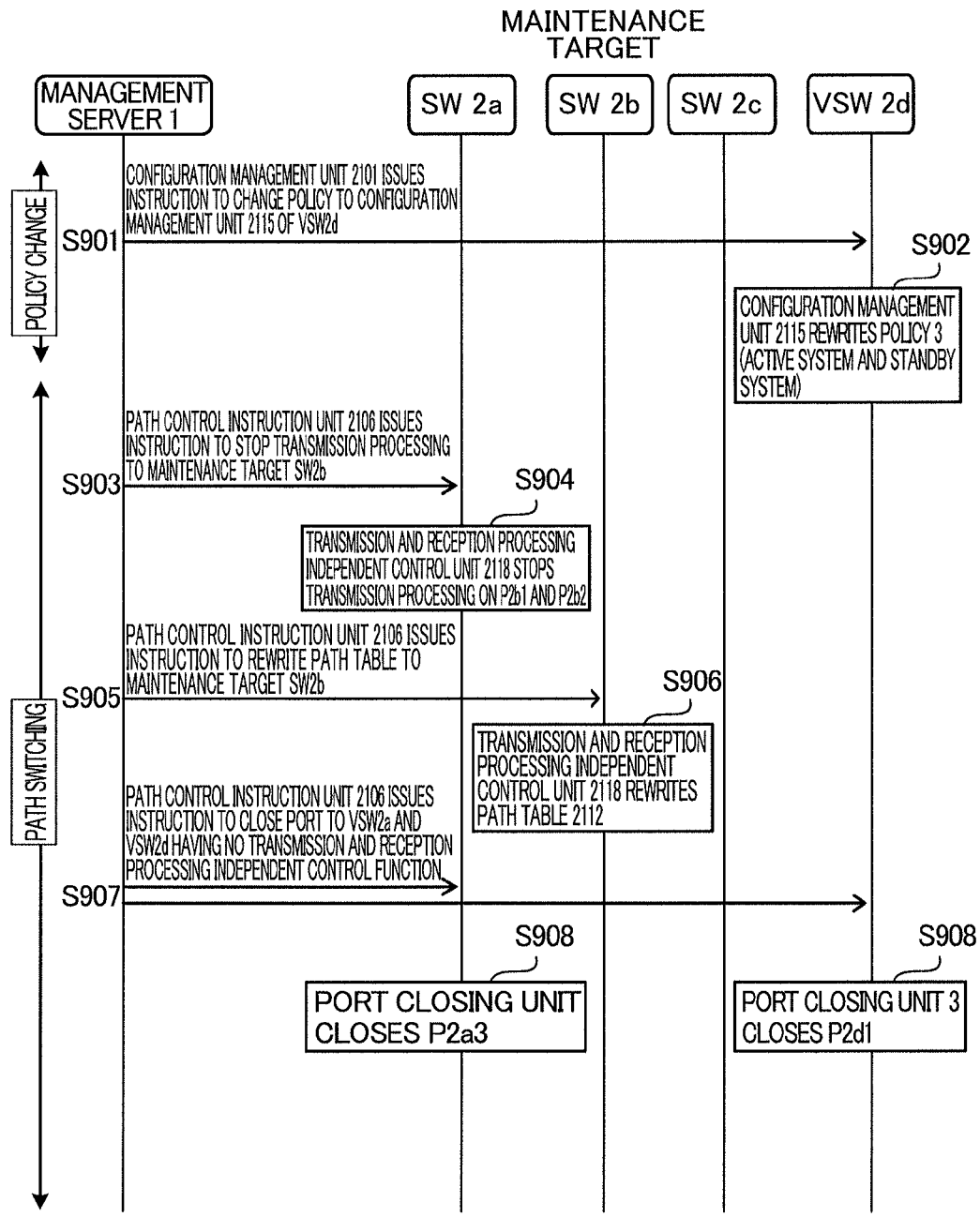
FIG. 9 is a sequence diagram showing a processing procedure example 4 of the communication path switching method in the present embodiment.

Then, in the network configuration shown in FIG. 2B, processing of excluding the maintenance target switch 32 from the communication path will be described. FIG. 9 is a sequence diagram showing a processing procedure example 4 of the communication path switching method in the present embodiment. This sequence shows processing in which the management server 1 issues an instruction of the path control to VSW2*a* and VSW2*d* which are the maintenance target switch 32 having the transmission and reception processing independent control function and the redundant branch switch 40 having no transmission and reception processing independent control function in order to exclude SW2*b* that is the maintenance target switch 32 from the communication path 35A.

In the present configuration, in order to prevent communication interruption caused by the communication with the closed ports (P2*a*3 of VSW2*a* and P2*d*1 of VSW2*d*) of the switches having no transmission and reception processing independent control function, an instruction of the path control to SW2*b* that is the maintenance target switch 32 having the transmission and reception processing independent control function is performed, and thereafter the path control processing on VSW2*a* and VSW2*d* having no transmission and reception processing independent control function is performed.

In this case, the configuration management unit 2101 of the management server 1 issues an instruction to change the standby system of the port (for example: P2*d*2 of VSW2*d*, P2*a*4 of VSW2*a*) which is the redundant branch switch that is not coupled to the maintenance target switch 32 within the same redundant group 30 as the maintenance target switch 32 to the active system and to change the active system (for example:P2*d*1 of VSW2*d*, P2*a*3 of VSW2*a*) which is the redundant branch switch that is coupled to the maintenance target switch 32 to the standby system (S901).

In this case, for example, the configuration management unit 2115 of VSW2*d* performs the rewriting of the policy specified by the management server 1 (S902). In other words, in the table of the configuration as shown in the coupling policy management table 2117 of FIG. 4C, the configuration management unit 2115 of VSW2*d* performs the changing processing on the active system and the standby system in the uplink ports "P2*d*2" and "P2*d*1".

Then, the path control instruction unit 2106 of the management server 1 issues, to SW2b that is the maintenance target switch 32 having the transmission and reception processing independent control function, an instruction to stop the transmission processing on the ports coupled to VSW2a and VSW2d which are the redundant branch switches 41 having no transmission and reception processing independent control function, that is, P2b1 and P2b2 (S903). On the other hand, the transmission and reception processing independent control unit 2118 of SW2b stops the transmission processing on P2b1 and P2b2 (S904).

Furthermore, the path control instruction unit 2106 of the management server 1 issues an instruction to rewrite, in the redundant configuration management table 2102, entries (P2b1 and P2b2) of the ports of SW2b having stopped the transmission processing in S903 described above to the port (P2b3) coupled to SW2c that is another maintenance candidate switch 31 within the same redundant group 30 (S905).

In this case, the transmission and reception processing independent control unit 2118 of SW2b rewrites the path table 2112 according to the above instruction provided by the management server 1 (S906). Although the path table 2112 is a general table, and its configuration is not particularly illustrated, since the path table 2112 is a table associating the destination (MAC address) of each network device with information on the interface port Pn, the transmission and reception processing independent control unit 2118 of SW2b rewrites the MAC address of the switch associated with the port concerned according to the instruction described above.

Then, the path control instruction unit 2106 of the management server 1 issues an instruction to close the port P2a3 coupled to SW2b that is the maintenance target switch 32 to VSW2a that is the redundant branch switch 41 having no transmission and reception processing independent control function and issues an instruction to close the port P2d1 coupled to SW2b that is the maintenance target switch 32 to VSW2d (S907).

In this case, the port opening and closing unit 2113 of VSW2a closes P2a3, and the port opening and closing unit 2113 of VSW2d closes P2d1 (S908).

Figure 10A:
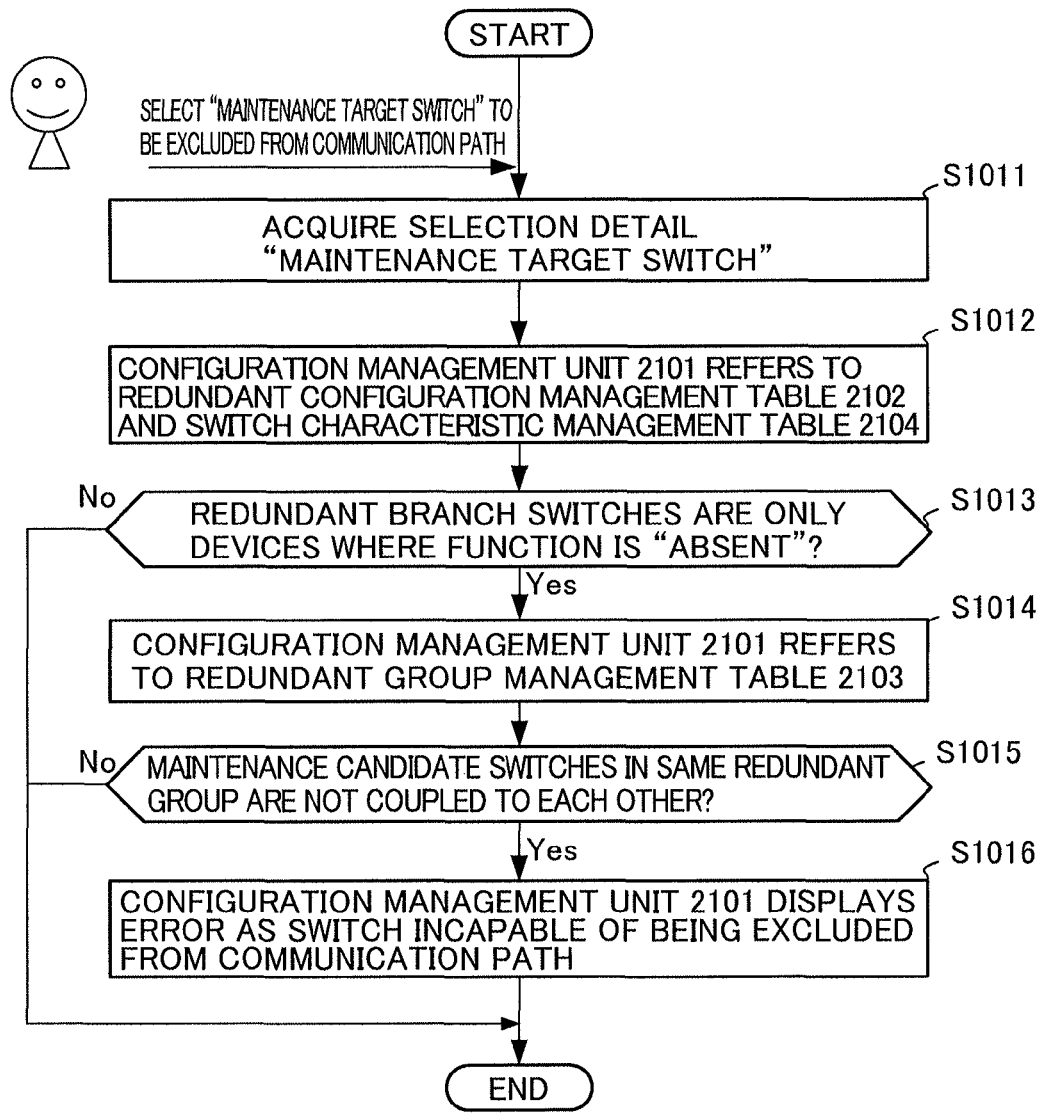
FIG. 10A is a flow chart showing a processing procedure example 5 of the communication path switching method in the present embodiment.

Then, a flow in which the management server 1 determines whether or not it is possible to exclude the maintenance target switch 32 from the communication path will be described. FIG. 10A is a flow chart showing a processing procedure example 5 of the communication path switching method in the present embodiment. In this case, the user is assumed to browse a management screen (see the screen 1200 of FIG. 12) displayed on the output device 23 of the management server 1 and to select the maintenance target switch 32 with the input device 22.

On the other hand, the management server 1 receives the details of the above-described selection of the maintenance target switch 32 by the user to start the subsequent processing (S1011). In this case, the configuration management unit 2101 of the management server 1 refers to the redundant configuration management table 2102 and the switch characteristic management table 2104 (S1012), and determines whether or not the redundant branch switches 36 coupled to the redundant group 30 to which the maintenance target switch 32 specified by the user in step S1011 described above belongs are only switches having no transmission and reception processing independent control function (S1013).

If a switch having the transmission and reception processing independent control function can be identified from among the redundant branch switches 36 coupled to the redundant group 30 to which the maintenance target switch 32 belongs (S1013: Yes), the management server 1 completes the present flow. In other words, the configuration management unit 2101 of the management server 1 determines that the network configuration which is the control target is a configuration on which the path control can be performed.

On the other hand, the redundant branch switches 36 coupled to the redundant group 30 to which the maintenance target switch 32 belongs are only switches having no transmission and reception processing independent control function (S1013: No), the configuration management unit 2101 of the management server 1 advances the processing to S1014.

Then, the configuration management unit 2101 refers to the redundant group management table 2103 (S1014) to determine whether or not information is present on the present table, that is, whether or not within the same redundant group 30, the maintenance candidate switches are not coupled to each other (S1015). If within the same redundant group 30, the maintenance candidate switches are coupled to each other, that is, the maintenance candidate switch 31 coupled to the maintenance target switch 32 described above is present (S1015: No), the configuration management unit 2101 of the management server 1 completes the present flow.

On the other hand, if within the same redundant group 30, the maintenance candidate switches are not coupled to each other, that is, the maintenance candidate switch 31 coupled to the maintenance target switch 32 described above is not present (S1015: Yes), the configuration management unit 2101 recognizes that the maintenance target switch 32 specified in the corresponding network configuration is a switch which cannot be the path control target, produces an error display (S1016) and completes the processing.

Figure 10B:
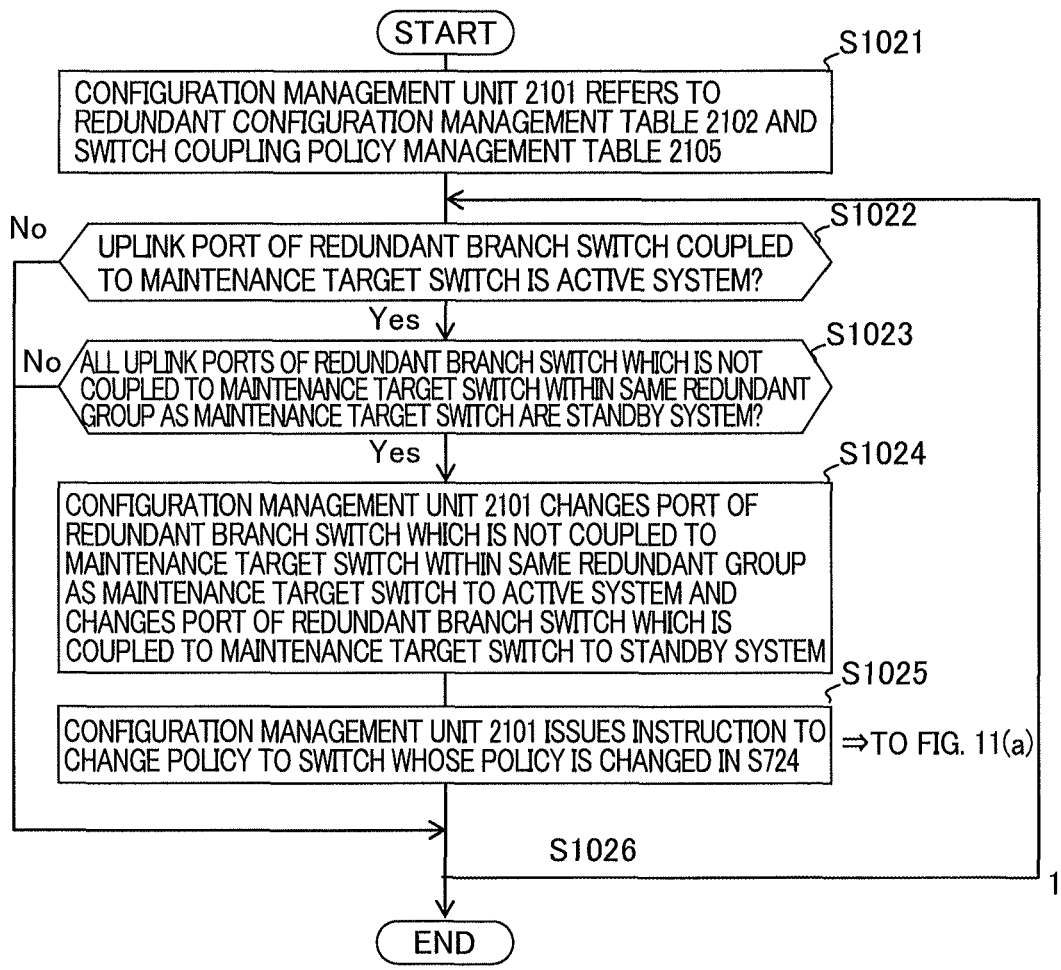
FIG. 10B is a flow chart showing a processing procedure example 6 of the communication path switching method in the present embodiment.

Then, processing that is performed after the flow shown in FIG. 10A, specifically, processing in which when the maintenance target switch 32 is excluded from the communication path, if it is necessary to change the policy of the redundant branch switch 36 that is coupled to the maintenance target switch 32, the policy is changed, will be described. FIG. 10B is a flow chart showing a processing procedure example 6 of the communication path switching method in the present embodiment.

Here, for example, if as indicated in the record of a policy identifier "4" in the switch coupling policy management table 2105 of FIG. 5H, the coupling policy of the uplink port "P2d1" in "VSW2d" that is coupled to SW2b which is the maintenance target switch 32 and that is the redundant branch switch 36 is the "standby system", VSW2d is in a state where VSW2d is prevented from communicating with SW2b that is the maintenance target switch 32. Hence, it can be said that the maintenance target switch 32 has already been excluded from the communication path 35A. However, for example, likewise, if as indicated in the record of a policy identifier "3", the uplink port "P2d1" in VSW2d that is coupled to SW2b which is the maintenance target switch 32 and that is the redundant branch switch 36 is the "active system", and the uplink port "P2d2" in VSW2d that is coupled to another maintenance candidate switch 31 belonging to the same redundant group 30 as SW2b is the "standby system", it is necessary to change the policy. A flow of the policy change under such conditions will be described below.

In this case, the configuration management unit 2101 of the management server 1 first refers to the redundant configuration management table 2102 and the switch coupling policy management table 2105 (S1021) to determine whether or not the uplink port of the redundant branch switch 36 coupled to the maintenance target switch 32 is the active system (S1022).

As a result of the determination in step S1022 described above, if the uplink port described above is the standby system (S1022: No), the configuration management unit 2101 completes the present flow. On the other hand, as a result of the determination in step S1022 described above, if the uplink port described above is the active system (S1022: Yes), the configuration management unit 2101 advances the processing to S1023.

The configuration management unit 2101 confirms whether or not all the uplink ports of the redundant branch switches that are not coupled to the maintenance candidate switches 31 within the same redundant group 30 as the maintenance target switch 32 are the standby system (S1023). If in step S1023 described above, the active system is present in the uplink ports (S1023: No), the configuration management unit 2101 completes the present flow.

On the other hand, if in step S1023, all the uplink ports are the standby system (S1023: Yes), the configuration management unit 2101 advances the processing to S1024. Here, the configuration management unit 2101 changes the uplink ports of the redundant branch switches 36 that are coupled to the maintenance target switch 32 within the same redundant group 30 as the maintenance target switch 32 in the switch coupling policy management table 2105 to the active system, and changes the uplink ports of the redundant branch switches 36 that are coupled to the maintenance target switch 32 to the standby system (S1024).

Then, the configuration management unit 2101 issues an instruction to change the policy to the redundant branch switches 36 whose policy has been changed in step S1024 described above (S1025). After step S1025 described above is executed, the processing from S1022 described above is repeatedly executed on each policy described in the switch coupling policy management table 2105 (S1026).

Figure 10C:
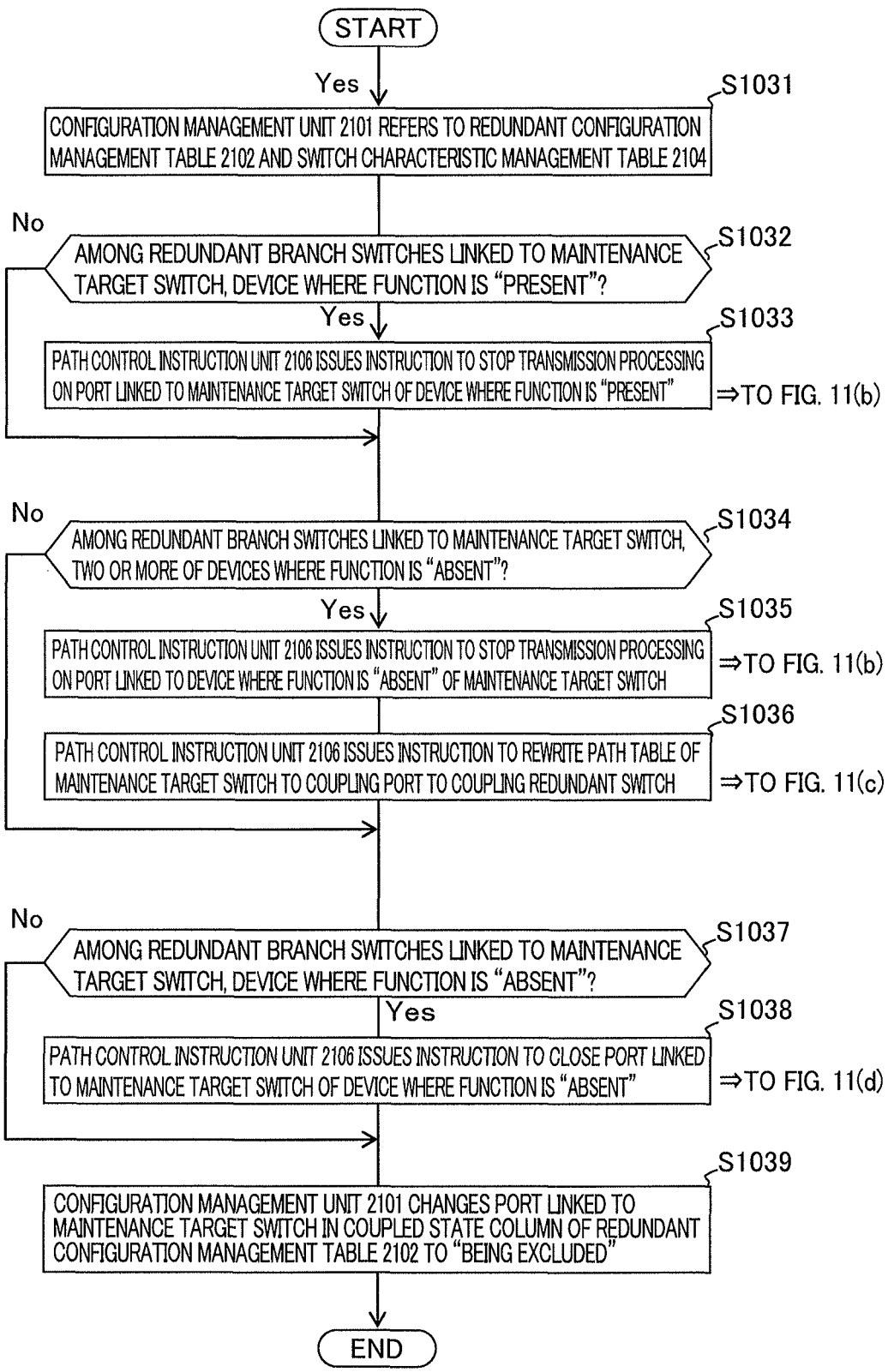
FIG. 10C is a flow chart showing a processing procedure example 7 of the communication path switching method in the present embodiment.

Then, processing that is performed after the flow shown in FIG. 10B, specifically, processing in which when the maintenance target switch 32 is excluded from the communication path, the management server 1 instructs the redundant branch switch 36 to switch the path, will be described. FIG. 10C is a flow chart showing a processing procedure example 7 of the communication path switching method in the present embodiment.

In this case, the configuration management unit 2101 of the management server 1 refers to the redundant configuration management table 2102 and the switch characteristic management table 2104 (S1031) to determine whether or not the redundant branch switch 36 linked to the maintenance target switch 32 has the transmission and reception processing independent control function (S1032).

The configuration management unit 2101 does not perform processing in the subsequent step S1033 on the redundant branch switch 36 in which the transmission and reception processing independent control function described above is "absent" (S1032: No). The path control instruction unit 2106 issues an instruction to stop the transmission processing on the port linked to the maintenance target switch 32 to the redundant branch switch 36 in which the transmission and reception processing independent control function described above is "present" (S1032: Yes) (S1033). The processing in these steps S1031 to S1033 is "function-incorporating device target processing".

If the determination in step S1032 described above is "No" or immediately after the processing in step S1033, the configuration management unit 2101 determines, based on information obtained in step S1031 described above, whether or not two or more switches in which the transmission and reception processing independent control function is "absent" are coupled to the redundant branch switch 36 coupled to the maintenance target switch 32 (S1034). As a result of the determination, if one or less switch in which the transmission and reception processing independent control function is "absent" is present (S1034: No), the configuration management unit 2101 does not perform processing in the subsequent steps S1035 and S1036.

On the other hand, as a result of the determination in step S1034 described above, if two or more switches in which the transmission and reception processing independent control function is "absent" are determined to be present (S1034: Yes), the path control instruction unit 2106 issues an instruction to stop the transmission processing on all the ports coupled to the redundant branch switch 41 in which the transmission and reception processing independent control function is "absence" in the maintenance target switch 32 (S1035). The path control instruction unit 2106 also issues an instruction to rewrite the entry of the port coupled to the redundant branch switch 41 in which the transmission and reception processing independent control function is "absent" in the path table 2112 of the maintenance target switch 32 to the port coupled to the maintenance candidate switches 31 indicated by the "coupling redundant switch" in the redundant group management table 2103 (S1036). The processing in these steps S1034 to S1036 is "specified device target processing".

If the determination in step S1034 described above is "No" or immediately after the processing in step S1036, the configuration management unit 2101 determines whether or not the switch in which the transmission and reception processing independent control function is "absent" is present in the redundant branch switches 36 linked to the maintenance target switch 32 (S1037).

The configuration management unit 2101 does not perform processing in the subsequent step S1038 on the switch in which the transmission and reception processing independent control function is "present" (S1037: No). On the other hand, the path control instruction unit 2106 issues, to the switch in which the transmission and reception processing independent control function is "absent" (S1037: Yes), an instruction to close the port that is coupled to the maintenance target switch 32 in the switch in which the transmission and reception processing independent control function is "absent" (S1038). Here, P2*d*1 of VSW2*d*, which is the redundant branch switch 41 having no transmission and reception processing independent control function, is in the closed state.

The configuration management unit 2101 rewrites the coupled state of the port linked to the maintenance target switch 32 in the coupled state column of the redundant configuration management table 2102 to the "state of being excluded" (S1039), and completes the processing. The "state of being excluded" described here refers to the state where the other switches do not communicate with the maintenance target switch 32 that is excluded from the communication path, and does not refer to, for example, a state where a physical link is removed. The processing in these steps S1037 to S1039 is "functionless device target processing".

Figure 10D:
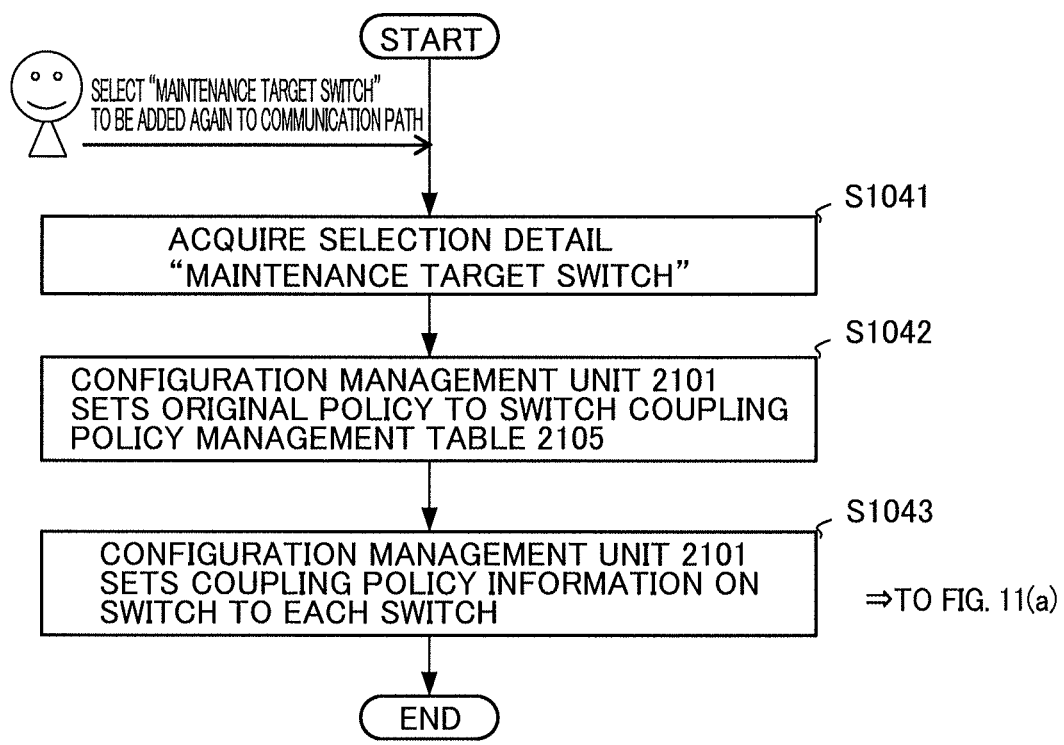
FIG. 10D is a flow chart showing a processing procedure example 8 of the communication path switching method in the present embodiment.

Processing of changing the policy of the redundant branch switch 36 when the maintenance target switch 32 temporarily excluded from the communication path is added again to the communication path will be described. FIG. 10D is a flow chart showing a processing procedure example 8 of the communication path switching method in the present embodiment. In this case, the user browses the management screen (see the screen 1200 of FIG. 12) displayed on the output device 23 of the management server 1 and selects the maintenance target switch 32 to be added to the communication path with the input device 22.

On the other hand, the management server 1 receives the details of the above-described selection of the maintenance target switch 32 by the user to start the subsequent processing (S1041). In this case, the configuration management unit 2101 of the management server 1 sets the original policy to the switch coupling policy 2105 (S1042). The original policy refers to the policy before the processing that performs the exclusion from the communication path; in the management server 1, when the maintenance target switch 32 is excluded from the communication path, the original policy is stored in the memory or the like. The configuration management unit 2101 refers to the switch coupling policy 2105 to notify the switch whose policy has been changed of a request for rewriting the policy (S1043).

Figure 10E:
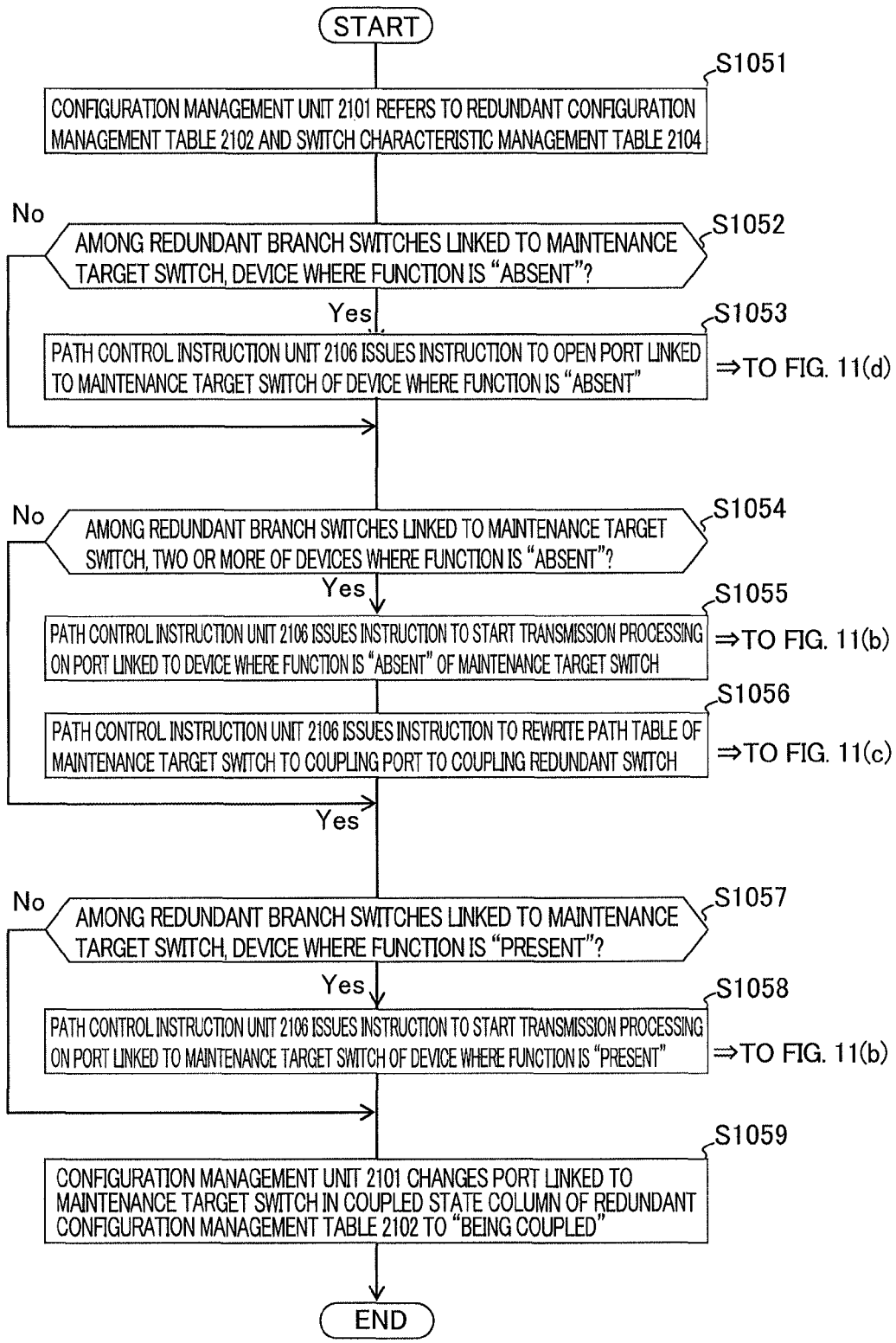
FIG. 10E is a flow chart showing a processing procedure example 9 of the communication path switching method in the present embodiment.

Then, processing that is performed after the flow shown in FIG. 10D, specifically, processing in which when the maintenance target switch 32 is added to the communication path, the management server 1 instructs the switch to switch the path, will be described. FIG. 10E is a flow chart showing a processing procedure example 9 of the communication path switching method in the present embodiment.

In this case, the configuration management unit 2101 of the management server 1 refers to the redundant configuration management table 2102 and the switch characteristic management table 2104 (S1051) to determine whether or not the switch in which the transmission and reception processing independent control function is "absent" is present in the redundant branch switches 36 linked to the maintenance target switch 32 (S1052). The configuration management unit 2101 does not perform processing in the subsequent step S1053 on the switch in which the transmission and reception processing independent control function is "present" (S1052: No).

On the other hand, the path control instruction unit 2106 issues, to the switch in which the transmission and reception processing independent control function is "absent" (S1052: Yes), an instruction to open the port that is coupled to the maintenance target switch 32 in the switch in which the transmission and reception processing independent control function is "absent" (S1053). The processing in these steps S1051 to S1053 is "functionless device target processing".

If the determination in step S1052 described above is "No" or immediately after the processing in step S1053, the configuration management unit 2101 determines whether or not two or more switches in which the transmission and reception processing independent control function is "absent" are coupled to the redundant branch switch 36 coupled to the maintenance target switch 32 (S1054). As a result of the determination in step S1054 described above, if one or less switch in which the transmission and reception processing independent control function is "absent" is present (S1054: No), the configuration management unit 2101 does not perform processing in the subsequent steps S1055 and S1056.

On the other hand, as a result of the determination in step S1054 described above, if two or more switches in which the transmission and reception processing independent control function is "absent" are determined to be present (S1054: Yes), the path control instruction unit 2106 issues an instruction to start the transmission processing on all the ports coupled to the redundant branch switch 41 in which the transmission and reception processing independent control function is "absent", in the maintenance target switch 32 (S1055).

Next, the path control instruction unit 2106 issues an instruction to rewrite the entry of the port coupled to the coupling redundant switch to the port coupled to the redundant branch switch 41 in which the transmission and reception processing independent control function is "absent" in the path table 2112 of the maintenance target switch 32 (S1056). The processing in these steps S1054 to S1056 is "specified device target processing".

If the determination in step S1054 described above is "No" or immediately after the processing in step S1056, the configuration management unit 2101 determines whether or not the redundant branch switch 36 linked to the maintenance target switch 32 has the transmission and reception processing independent control function (S1057). The configuration management unit 2101 does not perform processing in the subsequent step S1055 on the redundant branch switch 41 in which the transmission and reception processing independent control function is "absent" (S1057: No).

On the other hand, the path control instruction unit 2106 issues, to the redundant branch switch 40 in which the transmission and reception processing independent control function is "present" (S1057: Yes), an instruction to start the transmission processing on the port that is linked to the maintenance target switch 32 (S1058). The configuration management unit 2101 rewrites the coupled state of the port linked to the maintenance target switch in the coupled state column of the redundant configuration management table 2102 to the "state of being coupled" (S1059). The processing in these steps S1057 to S1059 is "function-incorporating device target processing".

Figure 10F:
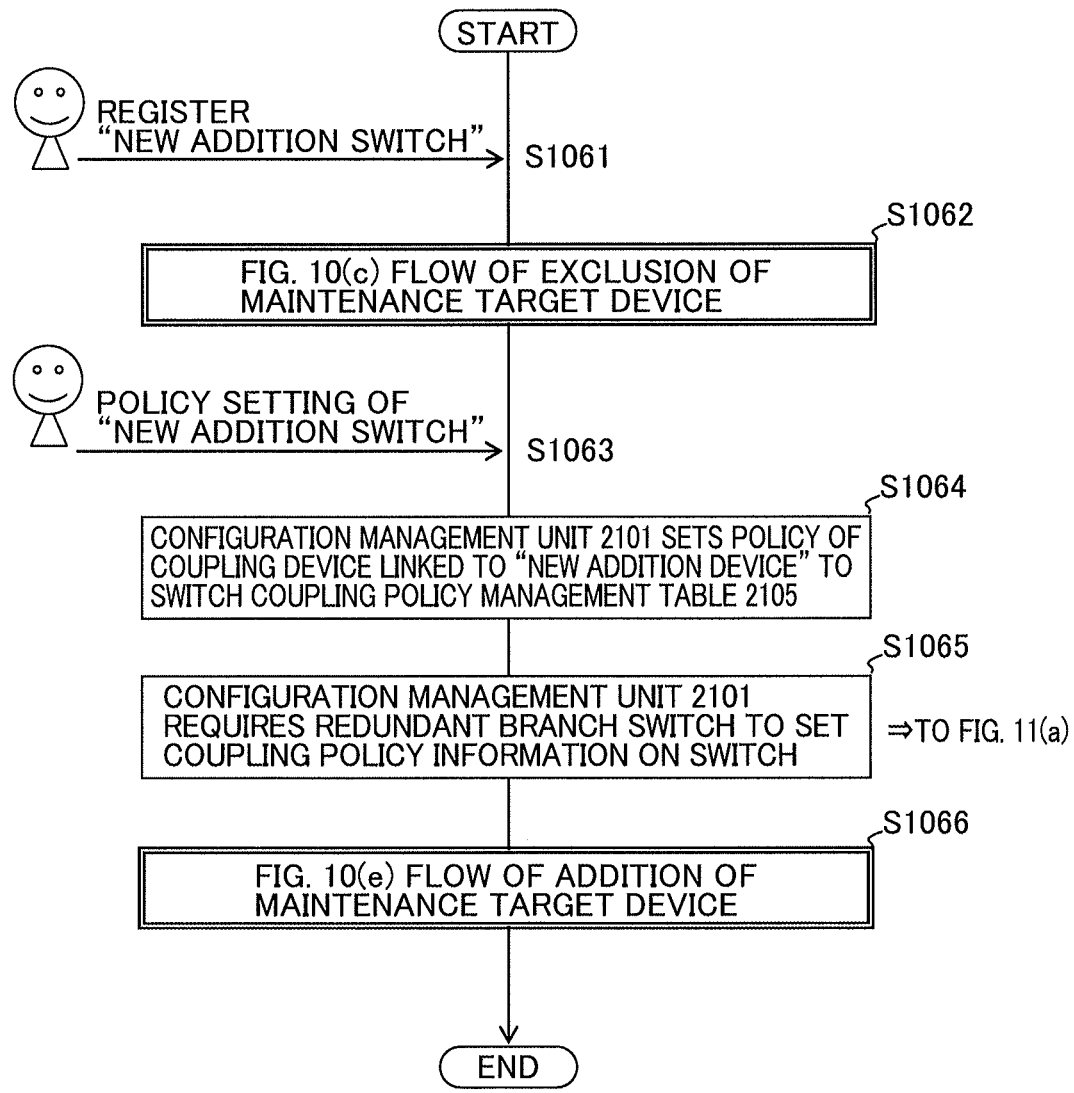
FIG. 10F is a flow chart showing a processing procedure example 10 of the communication path switching method in the present embodiment.

Processing that is performed by the management server 1 when the new addition switch is added to the communication path within the network system will now be described. FIG. 10F is a flow chart showing a processing procedure example 10 of the communication path switching method in the present embodiment. It is assumed that before the present flow is performed, the management server 1 and the new addition switch are first coupled by a predetermined network for management, ports other than the management port of the new addition switch are in the shut-down state and the new addition switch is physically coupled to the path to be added. In this case, the user registers the new addition switch through the input device 22. Specifically, with respect to the new addition switch, information on the redundant configuration management table 2102, the redundant group management table 2103 and the switch characteristic management table 2104 is registered.

The management server 1 receives the details of such a registration (S1061), regards the new addition switch as the maintenance target switch 32 and performs processing, which is shown in FIG. 10C described above, of excluding the maintenance target switch 32 from the communication path (S1062). At the time of the completion of this step S1062, the port of the new addition switch to which a link is physically coupled other than the management port may be released from the shut-down state.

Then, the user browses the management screen (see the management screen 1200 of FIG. 12) displayed on the output device 23 and registers, with the input device 22, information on the switch coupling policy management table 2105 related to the new addition switch.

The configuration management unit 2101 of the management server 1 receives the details of this registration (S1063), and sets, in the switch coupling policy management table 2105, the policy information registered by the user in step S1063 described above and held in the redundant branch switch coupled to the new addition switch (S1064).

The configuration management unit 2101 issues, to the redundant branch switch, a request for registering the information updated in step S1064 described above in the coupling policy management table 2117 (S1065). The management server 1 regards the new addition switch as the maintenance target switch 32, performs processing of adding the maintenance target switch 32 to the communication path shown in FIG. 10E (S1066) and completes the processing. What has been described above is the processing flow when the new addition switch is added to the communication path.

Figure 11A:
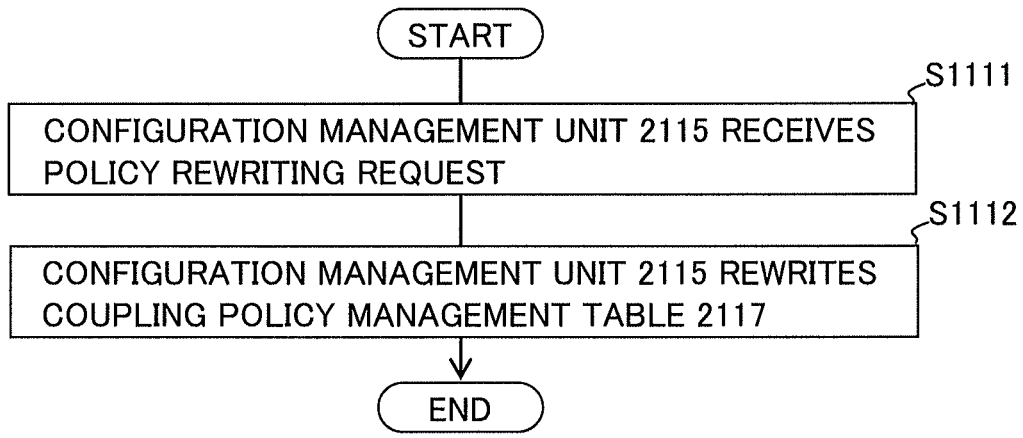
FIG. 11A is a flow chart showing a processing procedure example 11 of the communication path switching method in the present embodiment.

Then, processing at the redundant branch switch 36 subjected to step S1025 (FIG. 10B) described above will be described. FIG. 11A is a flow chart showing a processing procedure example 11 of the communication path switching method in the present embodiment. In this case, the configuration management unit 2115 of the redundant branch switch 36 receives a request for rewriting the policy from the management server 1 (S1111).

The configuration management unit 2115 rewrites the coupling policy management table 2117 according to the request received as described above or such that the uplink port specified by the management server 1 is changed from the active system to the standby system (S1112). As such an instruction from the management server 1 to the redundant branch switch 36, for example, there is a method of performing the following measure.

Specifically, the management server 1 uses a protocol in conformity with SSH (Secure Shell) to couple to the redundant branch switch 36, and logs in. In the redundant branch switch 36, a CLI (Command Line Interface) for rewriting the policy in which the details of the change of the policy is previously set at an argument is prepared, and the management server 1 using the SSH to couple to the redundant branch switch 36 performs the CLI and thereby can rewrite to arbitrary information. In the following description, it is assumed that an instruction or a request from the management server 1 to the redundant branch switch 36 is performed with, for example, the method of utilizing the SSH described above.

Figure 11B:
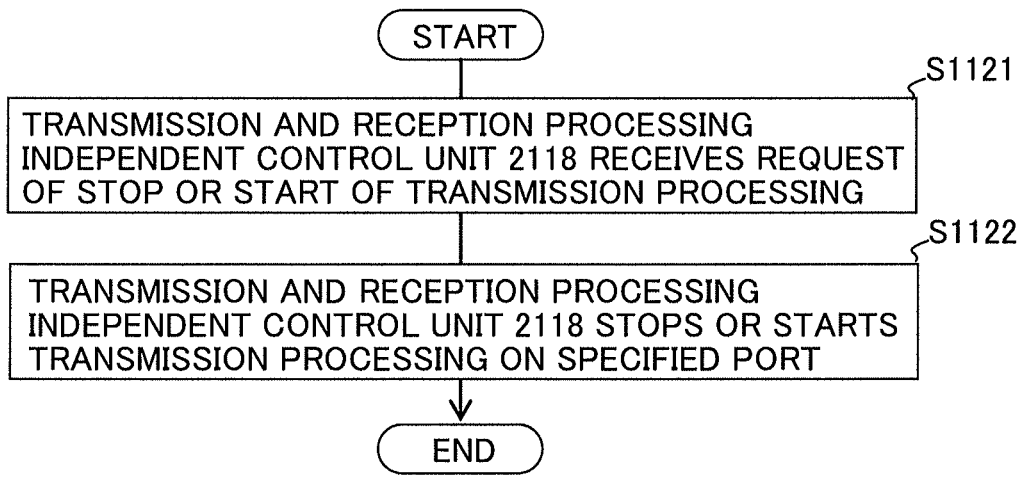
FIG. 11B is a flow chart showing a processing procedure example 12 of the communication path switching method in the present embodiment.

FIG. 11B is a flow chart showing a processing procedure example 12 of the communication path switching method in the present embodiment, specifically, a flow showing processing at the switch 2 subjected to step S1033 or S1035 (FIG. 10C) described above. In this case, the transmission and reception processing independent control unit 2118 of the redundant branch switch 40 receives a request for stopping (or a request for starting) the transmission processing on the port specified by the management server (S1121). The transmission and reception processing independent control unit 2118 stops (or starts) the transmission processing on the port concerned (S1122).

Figure 11C:
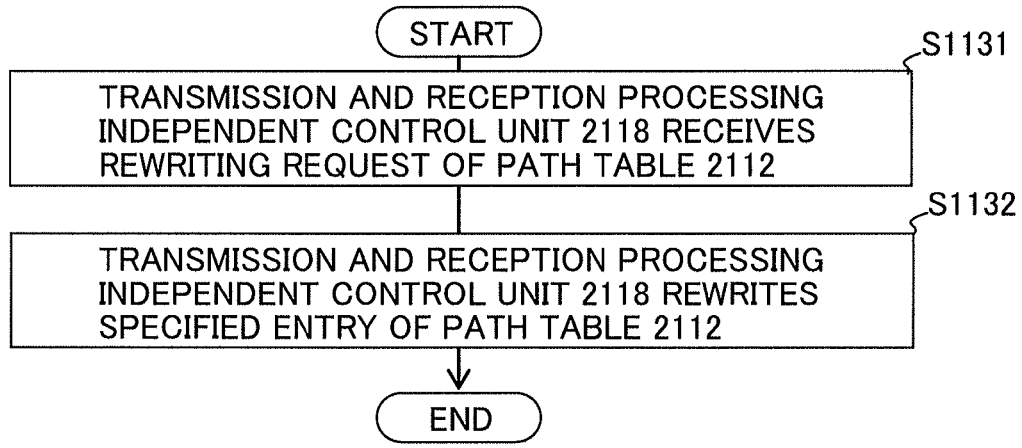
FIG. 11C is a flow chart showing a processing procedure example 13 of the communication path switching method in the present embodiment.

Processing at the redundant branch switch 40 subjected to step S1036 (FIG. 10C) described above will now be described. FIG. 11C is a flow chart showing a processing procedure example 13 of the communication path switching method in the present embodiment. In this case, the transmission and reception processing independent control unit 2118 of the redundant branch switch 40 receives, from the management server 1, a request for rewriting the path table 2112 (S1131). Then, the transmission and reception processing independent control unit 2118 rewrites the specified entry in the path table 2112 (S1132) and completes the processing.

Figure 11D:
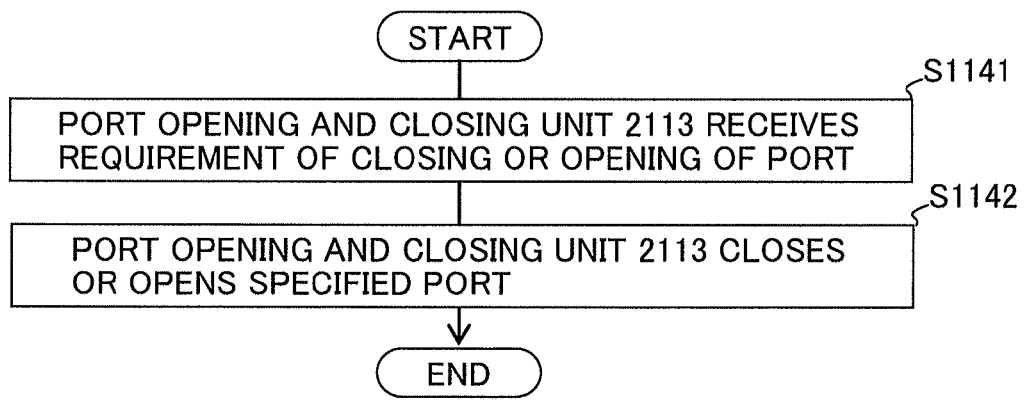
FIG. 11D is a flow chart showing a processing procedure example 14 of the communication path switching method in the present embodiment.

Then, processing at the redundant branch switch 41 subjected to step S1038 (FIG. 10C) described above will be described. FIG. 11D is a flow chart showing a processing procedure example 14 of the communication path switching method in the present embodiment. In this case, the port opening and closing unit 2113 of the redundant branch switch 41 receives a request for closing (or a request for opening) the port that is coupled from the management server 1 to the maintenance target switch 32 (S1141). The port opening and closing unit 7113 closes (or opens) the specified port (S1142), and completes the processing.

Figure 12:
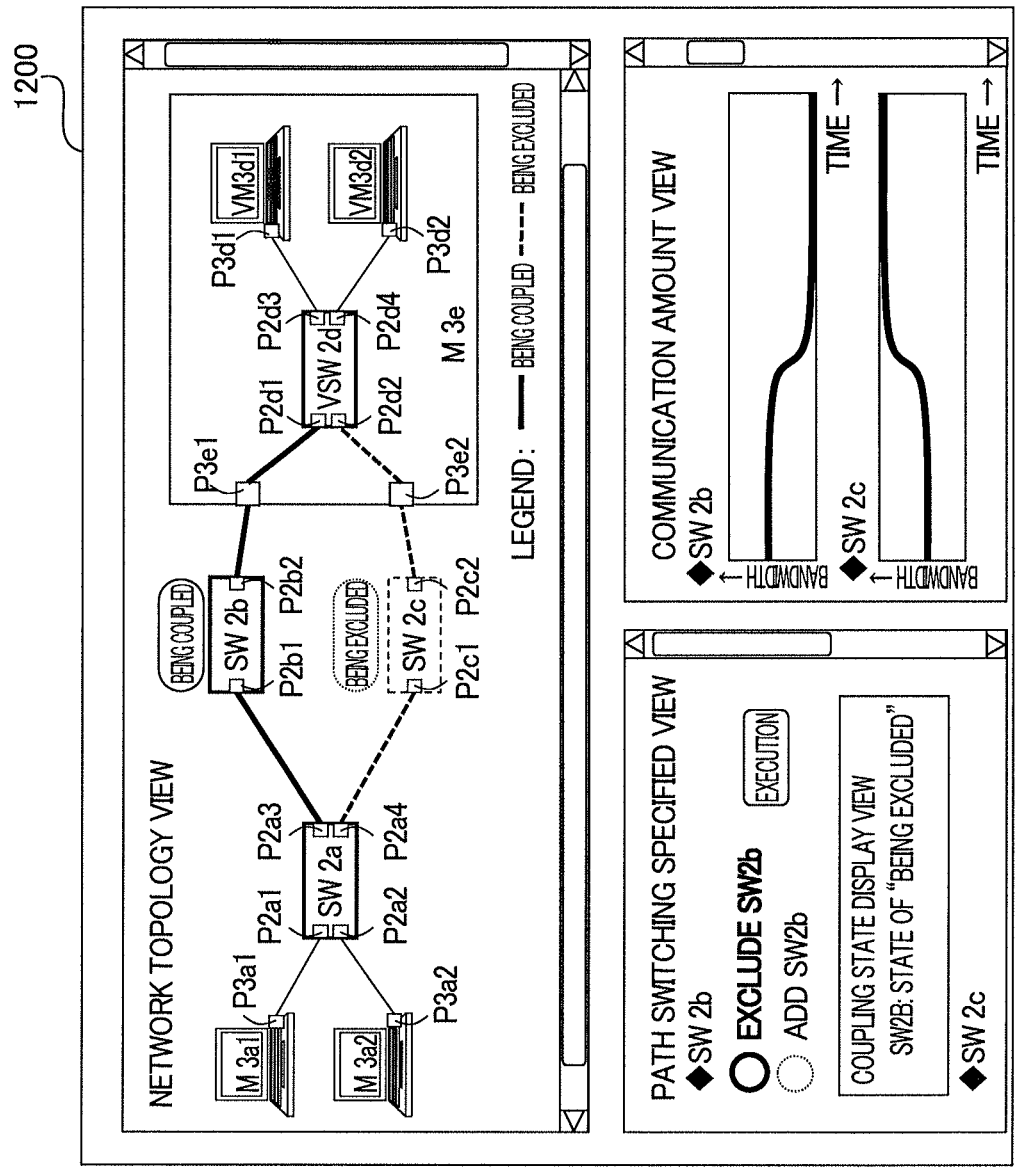
FIG. 12 is a diagram showing an example of a display screen in the present embodiment.

Then, an example of the management screen 1200 displayed on the output device 23 by the management server 1 will be described. FIG. 12 is a diagram showing an example of the display screen in the present embodiment. The management screen 1200 is a screen on which a manager or an operator (user) of the network system to which the communication path switching method of the present embodiment is applied performs browsing and operations.

The details of the operation performed on the management screen 1200 by the user are passed through the input device of the management server 1 to the processing unit performing execution in the memory 21. The details performed in the processing unit of the memory 21 are displayed on the management screen 1200 through the output device 23. The management screen 1200 includes: for example, as shown in a display region 1210, a network topology view 1211 displaying a network topology; and as shown in a display region 1220, a path switching specified view 1221 that specifies a switch which is excluded or added from or to the communication path.

Moreover, the management screen 1200 may include: a view 1231 that displays, as shown in a display region 1230, the amount of communication per specified unit such as unit of each switch or unit of an interface port; and a log display view that displays, though not shown in the figure, the date and time when an action such as exclusion or addition of the maintenance target switch from or to the communication path is taken and the amount of communication flowing each switch (at least any one of the maintenance candidate switch, the maintenance target switch and the redundant branch switch).

As a view for grasping whether the maintenance target switch is in a state where it is excluded from the communication path (being excluded) or not (being coupled), as shown in the path switch specified view 1211, a coupled state display view 1212 may be included. In the network topology view 1211, whether the maintenance target switch is being excluded or is being coupled may be shown. The configuration of the management screen 1200 shown in FIG. 12 is simply an example.

The input reception and data display of the processing of excluding an arbitrary switch in the present embodiment from the communication path or adds it to the communication path do not necessarily need to be performed through a GUI (Graphical User Interface) such as the management screen 1200. For example, a form in which the user input reception and data display are performed through a CLI (Command Line Interface) or a form in which the user input reception and data display are performed through an API (Application Program Interface) may be adopted.

For example, in the network configuration shown FIG. 2A, when SW2b is excluded as the maintenance target switch 32 from the communication path 35A, all communication that has so far passed through SW2b is made to pass through SW2c of the maintenance candidate switch 31. However, when the amount of communication that has already passed through SW2c is close to the upper limit of the permissible amount in SW2c, the communication with SW2b passes through SW2c, and thus congestion may occur at SW2c, there may be times when the communication is interrupted or the response between machines serving as end nodes may be degraded.

Hence, preferably, the communication amount confirmation unit 2107 of the management server 1 measures, for example, every certain time T, per switch, link or the like, the amount of communication, changes the communication path and thereby monitors whether the amount of communication exceeds the permissible amount of link. The communication amount management table 2108 shown in FIG. 13 stores the results of the measurements of the amount of communication per time described above.

More preferably, if the communication amount confirmation unit 2107 of the management server 1, for example, updates the communication amount management table 2108 every predetermined time, compares the speed of increase in the amount of communication with a predetermined reference value and thereby detects that the amount of communication may exceed the permissible amount of link by the change of the communication path, on the management screen 1200 shown in FIG. 12, a predetermined warning notification is displayed.

Although in the present embodiment, the transmission and reception processing independent control function is described as the function capable of independently controlling the transmission processing and reception processing, as a feasible unit, for example, Openflow may be utilized. The Openflow does not produce the path table 2112 by reading the destination of the communication but performs communication according to the path inquired of an Openflow controller. It is possible to intentionally rewrite the path table 2112 from the Openflow controller and switch the communication to an arbitrary path. Hence, instead of using the transmission and reception processing independent control function described in Non-Patent Document 1, the switch corresponding to the Openflow and the Openflow controller may be utilized.

Although the preferred embodiment and the like according to the present invention have been specifically described above, the present invention is not limited to this configuration, and various modifications are possible without departing from its spirit.

According to the present embodiment described above, it is possible to suppress the occurrence of a communication breakdown in maintaining the network device present on the redundant path.

The description of the present specification clarifies at least the followings. Specifically, preferably, in the communication path switching device of the present embodiment, when the computation device identifies that all the network devices which are the path switching targets have no independent control function, and that the specified network device does not couple to another network device coupled to the network devices that are the path switching targets, based on the individual pieces of information on the coupling configuration and the presence or absence of the independent control function in the storage device, the computation device may determine that it is impossible to exclude the specified network device from the communication path, and perform processing to output a result of the determination to an output device. In this way, it is possible to suppress the occurrence of a communication breakdown or the like caused by exclusion the network device of the maintenance target from the communication path.

Preferably, in the communication path switching device of the present embodiment, the computation device determines whether or not a condition is satisfied in which an uplink port directed to the specified network device in which the exclusion is specified in the network devices that are the path switching targets is an active system and all uplink ports not directed to the specified network device in which the exclusion is specified in the network devices that are the path switching targets are standby systems, for each of the coupling policies, based on the individual pieces of information on the coupling configuration and the coupling policy in the storage device, changes the uplink port directed to the specified network device in which the exclusion is specified in the network devices that are the path switching targets to the standby system in which the condition is satisfied as a result of the determination and changes one or more of the uplink ports not directed to the specified network device in which the exclusion is specified in the network devices that are the path switching targets to the active system. In this way, it is possible to perform path switching with sufficient consideration given to the form of utilization of the network device in the communication path.

Preferably, in the communication path switching device of the present embodiment, the computation device may perform one or more of function-incorporating device target processing of issuing the path switching instruction to the network device having the independent control function on the communication path directed to the specified network device in which the exclusion is specified, specified device target processing of issuing the path switching instruction to the specified network device having the independent control function in which the exclusion is specified and functionless device target processing of issuing the path switching instruction to the network device having no independent control function on the communication path directed to the specified network device in which the exclusion is specified. In this way, it is possible to perform path switching processing, without any failure, to accurately correspond to each pattern in the number corresponding to the number of network devices having the transmission and reception independent control function among the network devices.

Preferably, in the communication path switching device of the present embodiment, in the function-incorporating device target processing, the computation device may issue an instruction to stop transmission processing on a port directed to the specified network device in which the exclusion or the addition is specified in the network devices that are the path switching targets, when the network devices that are the path switching targets have the independent control function, on the communication path directed to the specified network device in which the exclusion or the addition is specified based on the individual pieces of information on the coupling configuration and the presence or absence of the independent control function in the storage device. In this way, it is possible to prevent the occurrence of a packet loss caused by passing a communication packet into the network device which is a maintenance target or the like and to thereby perform path switching processing without any failure.

Preferably, in the communication path switching device of the present embodiment, the computation device, in the specified device target processing, may issue an instruction to stop transmission processing on a port directed to the network devices that are the path switching targets in the specified network device in which the exclusion or the addition is specified, when two or more of the network devices that are the path switching targets have no independent control function on the communication path directed to the specified network device in which the exclusion or the addition is specified based on the individual pieces of information on the coupling configuration and the presence or absence of the independent control function in the storage device. In this way, it is possible to prevent the occurrence of a packet loss caused by passing a communication packet into the network device which is a switching target and to thereby perform path switching processing without any failure.

Preferably, in the communication path switching device of the present embodiment, the computation device, in the functionless device target processing, may issue an instruction to stop transmission processing and reception processing on a port directed to the specified network device in which the exclusion or the addition is specified in the network devices that are the path switching targets, when the network devices that are the path switching targets have no independent control function on the communication path directed to the specified network device in which the exclusion or the addition is specified based on the individual pieces of information on the coupling configuration and the presence or absence of the independent control function in the storage device. In this way, it is possible to prevent the occurrence of a communication packet loss caused by path switching in the network device having no transmission and reception independent control function and to thereby perform path switching processing without any failure.

Preferably, in the communication path switching device of the present embodiment, the computation device may perform one or more of functionless device target processing of issuing the path switching instruction to the network device having no independent control function on the communication path directed to the specified network device in which the addition is specified, function-incorporating device target processing of issuing the path switching instruction to the network device having the independent control function on the communication path directed to the specified network device in which the addition is specified and specified device target processing of issuing the path switching instruction to the specified network device having the independent control function in which the addition is specified. In this way, it is possible to correspond to processing of so-called "switching back" in which the network device is temporarily excluded and is thereafter returned by addition, and to thereby perform path switching processing without any failure.

Preferably, in the communication path switching device of the present embodiment, the computation device, in the functionless device target processing, may issue an instruction to start transmission processing and reception processing on a port directed to the specification network device in which the exclusion or the addition is specified in the network devices that are the path switching targets, when the network devices that are the path switching targets have no independent control function on the communication path directed to the specified network device in which the exclusion or the addition is specified based on the individual pieces of information on the coupling configuration and the presence or absence of the independent control function in the storage device. In this way, it is possible to prevent the occurrence of a communication packet loss caused by path switching in the network device having no transmission and reception independent control function and to thereby perform path switching processing without any failure.

Preferably, in the communication path switching device of the present embodiment, the computation device, in the function-incorporating device target processing, may issue an instruction to start transmission processing on a port directed to the specified network device in which the exclusion or the addition is specified in the network devices that are the path switching targets, when the network devices that are the path switching targets have the independent control function on the communication path directed to the specified network device in which the exclusion or the addition is specified based on the individual pieces of information on the coupling configuration and the presence or absence of the independent control function in the storage device. In this way, it is possible to prevent the occurrence of a packet loss caused by passing a communication packet into the network device which is a maintenance target or the like and to thereby perform path switching processing without any failure.

Preferably, in the communication path switching device of the present embodiment, the computation device, in the specified device target processing, may issue an instruction to start transmission processing on a port directed to the network devices that are the path switching targets in the specification network device in which the exclusion or the addition is specified, when two or more of the network devices that are the path switching targets have no independent control function on the communication path directed to the specified network device in which the exclusion or the addition is specified based on the individual pieces of information on the coupling configuration and the presence or absence of the independent control function in the storage device. In this way, it is possible to prevent the occurrence of a packet loss caused by passing a communication packet into the network device which is a switching target and to thereby perform path switching processing without any failure.

Preferably, in the communication path switching device of the present embodiment, the computation device may perform addition processing to the communication path on the specified network device in which the addition to the communication path is specified, and then temporarily performs exclusion processing from the communication path on the specified network device in which the addition is specified, issue an instruction to set the coupling policy of the network device in which the addition is specified to the network devices that are the path switching targets on the communication path directed to the network device on which the exclusion processing is performed and perform the addition processing to the communication path on the network device in which the addition is specified. In this way, it is possible to correspond to processing of completely newly adding the network device and to thereby perform path switching processing without any failure.

Preferably, in the communication path switching device of the present embodiment, the computation device outputs, to an output device, a command line interface displaying a communication state between the network devices that are the path switching targets and the specified network device on the communication path. In this way, it is possible to easily recognize a communication state in path switching processing performed by a network manager or the like.

Preferably, in the communication path switching device of the present embodiment, the computation device outputs, to an output device, a GUI displaying a communication state between the network devices that are the path switching targets and the specified network device on the communication path. In this way, it is possible to easily recognize a communication state in path switching processing performed by a network manager or the like.

Preferably, in the communication path switching device of the present embodiment, the computation device may acquire a value of an amount of communication in each network device present between the network devices that are the path switching targets on the communication path directed to the network device in which the exclusion is specified, determine, by passing of communication through the network device in which the exclusion is specified to other network devices caused by path switching processing, whether or not an amount of communication in the other network devices exceeds a predetermined permissible amount and display, when the amount of communication exceeds the predetermined permissible amount, a predetermined warning on a command line interface or a GUI in an output device. In this way, it is possible to clearly present an effect on the network caused bypath switching processing to a network manager or the like and to eventually perform path switching processing without any failure.

What is claimed is:

1. A communication path switching device performing communications in conformity with Ethernet, comprising:
   a storage device that stores individual pieces of information on a coupling configuration of network devices, a presence or absence of an independent control function of transmission and reception processing in each of the network devices, and a switching configuration of the network devices; and
   a computation device configured to perform
      processing of determining whether or not a specified network device in which exclusion from a communication path or addition to the communication path is specified through an input device can perform path switching based on the individual pieces of information on the coupling configuration and the presence or absence of the independent control function;
      processing of referring to the storage device for the individual pieces of information on the coupling configuration and the switching configuration to change the switching configuration according to a result of the determination; and
      processing of issuing, according to the result of the determination and the individual pieces of information in the storage device, a change configuration for path switching to the network device having the independent control function and the network device not having the independent control function which are path switching targets on the communication path toward the specified network device.

2. The communication path switching device according to claim 1,
   wherein the computation device is configured to perform processing of determining that it is impossible to exclude the specified network device from the communication path to output a result of the determination to an output device, when identifying that all the network devices which are the path switching targets have no independent control function and that the specified network device does not couple to another network device coupled to the network devices that are the path switching targets, based on the individual pieces of information on the coupling configuration and the presence or absence of the independent control function in the storage device.

3. The communication path switching device according to claim 1,
   wherein based on the individual pieces of information on the coupling configuration and the switching configuration in the storage device, the computation device, for each of the coupling policies, is configured to
      determine whether or not a condition is satisfied in which an uplink port directed to the specified network device in which the exclusion is specified in the network devices that are the path switching targets is an active system and all uplink ports that are not directed to the specified network device in which the exclusion is specified in the network devices that are the path switching targets are standby systems,
      change the uplink port directed to the specified network device in which the exclusion is specified in the network devices that are the path switching targets to the standby system when the condition is satisfied as a result of the determination, and change one or more of the uplink ports that are not directed to the specified network device in which the exclusion is specified in the network devices that are the path switching targets to the active system.

4. The communication path switching device according to claim 1,
   wherein the computation device is configured to perform one or more of
      function-incorporating device target processing of issuing the change configuration for path switching to the network device having the independent control function on the communication path directed to the specified network device in which the exclusion is specified,
      specified device target processing of issuing the change configuration for path switching to the specified network device having the independent control function in which the exclusion is specified, and
      functionless device target processing of issuing the change configuration for path switching to the network device not having the independent control function on the communication path directed to the specified network device in which the exclusion is specified.

5. The communication path switching device according to claim 4,
   wherein, in the function-incorporating device target processing, the computation device is configured to issue, based on the individual pieces of information on the coupling configuration and the presence or absence of the independent control function in the storage device, an instruction to stop transmission processing of a port directed to the specified network device in which the exclusion or the addition is specified in the network devices that are the path switching targets, when the network devices that are the path switching targets have the independent control function on the communication path directed to the specified network device in which the exclusion or the addition is specified.

6. The communication path switching device according to claim 4,
   wherein, in the specified device target processing, the computation device is configured to issue, based on the individual pieces of information on the coupling configuration and the presence or absence of the independent control function in the storage device, an instruction to stop transmission processing of a port directed to the network devices that are the path switching targets in the specified network device where the exclusion or the addition is specified, when two or more of the network devices that are the path switching targets do not have the independent control function on the communication path directed to the specified network device in which the exclusion or the addition is specified.

7. The communication path switching device according to claim 4,
wherein, in the functionless device target processing, the computation device is configured to issue, based on the individual pieces of information on the coupling configuration and the presence or absence of the independent control function in the storage device, an instruction to stop transmission processing and reception processing of a port directed to the specified network device in which the exclusion or the addition is specified in the network devices that are the path switching targets, when the network devices that are the path switching targets do not have the independent control function on the communication path directed to the specified network device in which the exclusion or the addition is specified.

8. The communication path switching device according to claim 1,
wherein the computation device is configured to perform one or more of
functionless device target processing of issuing the change configuration for path switching to the network device not having the independent control function on the communication path directed to the specified network device in which the addition is specified,
function-incorporating device target processing of issuing the change configuration for path switching to the network device having the independent control function on the communication path directed to the specified network device in which the addition is specified, and
specified device target processing of issuing the change configuration for path switching to the specified network device having the independent control function in which the addition is specified.

9. The communication path switching device according to claim 8,
wherein, in the functionless device target processing, the computation device is configured to issue, based on the individual pieces of information on the coupling configuration and the presence or absence of the independent control function in the storage device, an instruction to start transmission processing and reception processing of a port directed to the specified network device in which the exclusion or the addition is specified in the network devices that are the path switching targets, when the network devices that are the path switching targets do not have the independent control function on the communication path directed to the specified network device in which the exclusion or the addition is specified.

10. The communication path switching device according to claim 8,
wherein, in the function-incorporating device target processing, the computation device is configured to issue, based on the individual pieces of information on the coupling configuration and the presence or absence of the independent control function in the storage device, an instruction to start transmission processing of a port directed to the specified network device in which the exclusion or the addition is specified in the network devices that are the path switching targets, when the network devices that are the path switching targets have the independent control function on the communication path directed to the specified network device in which the exclusion or the addition is specified.

11. The communication path switching device according to claim 8,
wherein, in the specified device target processing, the computation device is configured to issue, based on the individual pieces of information on the coupling configuration and the presence or absence of the independent control function in the storage device, an instruction to start transmission processing of a port directed to the network devices that are the path switching targets in the specified network device in which the exclusion or the addition is specified, when two or more of the network devices that are the path switching targets do not have the independent control function on the communication path directed to the specified network device in which the exclusion or the addition is specific.

12. The communication path switching device according to claim 1,
wherein the computation device is configured to
perform addition processing to the communication path on the specified network device in which the addition to the communication path is specified, and then temporarily perform exclusion processing from the communication path on the specified network device in which the addition is specified,
issue an instruction to set the switching configuration of the specified network device in which the addition is specified to the network devices that are the path switching targets on the communication path directed to the specified network device on which the exclusion processing is performed, and
perform the addition processing to the communication path on the specified network device in which the addition is specified.

13. The communication path switching device according to claim 1,
wherein the computation device is configured to output, to an output device, a command line interface displaying a communication state between the network devices that are the path switching targets and the specified network device on the communication path.

14. The communication path switching device according to claim 1,
wherein the computation device is configured to output, to an output device, a GUI displaying a communication state between the network devices that are the path switching targets and the specified network device on the communication path.

15. The communication path switching device according to claim 1,
wherein the computation device is configured to acquire a value of an amount of communication in each network device present between the network devices that are the path switching targets on the communication path directed to the specified network device in which the exclusion is specified, determine, by passing of communication through the specified network device in which the exclusion is specified to other network devices caused by path switching processing, whether or not an amount of communication in the other network devices exceeds a predetermined permissible amount, and display, when the amount of communication exceeds the predetermined permissible amount, a predetermined warning on a command line interface or a GUI in an output device.

16. A communication path switching method in an information processing device including a computation device and a storage device that stores individual pieces of information on a coupling configuration of network devices, a presence or absence of an independent control function of transmission and reception processing in each of the network devices, and a switching configuration of the network devices, the method comprising:
processing of determining whether or not a specified network device in which exclusion from a communication path or addition to the communication path is specified through an input device can perform path switching based on the individual pieces of information on the coupling configuration and the presence or absence of the independent control function;
processing of referring to the storage device for the individual pieces of information on the coupling configuration and the switching configuration to change the switching configuration according to a result of the determination; and
processing of issuing, according to the result of the determination and the individual pieces of information in the storage device, a change configuration for path switching to the network device having the independent control function and the network device not having the independent control function which are path switching targets on the communication path toward the specified network device.

17. A communication path switching program causing an information processing device including a computation device and a storage device that stores individual pieces of information on a coupling configuration of network devices, a presence or absence of an independent control function of transmission and reception processing in each of the network devices, and a switching configuration of the network devices, to perform:
processing of determining whether or not a specified network device in which exclusion from a communication path or addition to the communication path is specified through an input device can perform path switching based on the individual pieces of information on the coupling configuration and the presence or absence of the independent control function;
processing of referring to the storage device for the individual pieces of information on the coupling configuration and the switching configuration to change the switching configuration according to a result of the determination; and
processing of issuing, according to the result of the determination and the individual pieces of information in the storage device, a change configuration for path switching to the network device having the independent control function and the network device not having the independent control function which are path switching targets on the communication path toward the specified network device.

* * * * *